US007913565B2

(12) United States Patent
Killion et al.

(10) Patent No.: US 7,913,565 B2
(45) Date of Patent: Mar. 29, 2011

(54) METHOD AND SYSTEM FOR PREDICTING LONG-TERM EXPOSURE TO A HAZARDOUS ENVIRONMENT

(75) Inventors: Mead C. Killion, Elk Grove Village, IL (US); Jack Goldberg, San Diego, CA (US); Thomas V. Fantasia, Del Mar, CA (US)

(73) Assignee: Etymotic Research, Inc., Elk Grove Village, IL (US)

( * ) Notice: Subject to any disclaimer, the term of this patent is extended or adjusted under 35 U.S.C. 154(b) by 86 days.

(21) Appl. No.: 12/502,770

(22) Filed: Jul. 14, 2009

(65) Prior Publication Data

US 2009/0272192 A1 Nov. 5, 2009

Related U.S. Application Data

(63) Continuation-in-part of application No. 11/654,419, filed on Jan. 17, 2007, now Pat. No. 7,836,770, which is a continuation-in-part of application No. 11/643,328, filed on Dec. 20, 2006.

(60) Provisional application No. 60/759,460, filed on Jan. 17, 2006, provisional application No. 60/760,564, filed on Jan. 20, 2006, provisional application No. 60/752,761, filed on Dec. 20, 2005.

(51) Int. Cl.
*G01H 11/06* (2006.01)
*H04R 29/00* (2006.01)

(52) U.S. Cl. ............... 73/647; 73/585; 73/642; 181/130

(58) Field of Classification Search .................... 73/585, 73/642, 646, 647; 181/130
See application file for complete search history.

(56) References Cited

U.S. PATENT DOCUMENTS

| | | | | |
|---|---|---|---|---|
| 3,878,496 | A * | 4/1975 | Erickson | 250/336.1 |
| 4,605,858 | A * | 8/1986 | Terhune | 250/374 |
| 6,765,214 | B1 * | 7/2004 | Kosslow et al. | 250/376 |
| 6,978,286 | B2 * | 12/2005 | Francis et al. | 708/132 |
| 7,171,312 | B2 * | 1/2007 | Steinthal et al. | 702/32 |
| 7,836,770 | B2 * | 11/2010 | Goldberg et al. | 73/647 |
| 2007/0180915 | A1 * | 8/2007 | Goldberg et al. | 73/647 |
| 2010/0278350 | A1 * | 11/2010 | Rung | 381/59 |

* cited by examiner

*Primary Examiner* — Jacques M Saint Surin
(74) *Attorney, Agent, or Firm* — McAndrews, Held & Malloy, Ltd.

(57) ABSTRACT

Certain embodiments of the present invention provide a system and method for predicting long-term exposure to a hazardous environment based on a user-controllable measurement interval of short duration. In an embodiment, the system includes an electronic circuit for receiving one or more signals representative of the level of a hazard in an environment using one or more of a hazard level sensor and a direct input jack. The system further includes a processor within the electronic circuit for determining an accumulated dose over a user-controllable measurement interval. In addition, the processor predicts hazardous exposure for a user-settable extended period greater than the user-controllable measurement interval and based on the accumulated dose. The dosimeter also includes a user-operable switch within the electronic circuit and in communication with the processor for controlling the user-controllable measurement interval to be less than a nominal measurement interval.

20 Claims, 17 Drawing Sheets

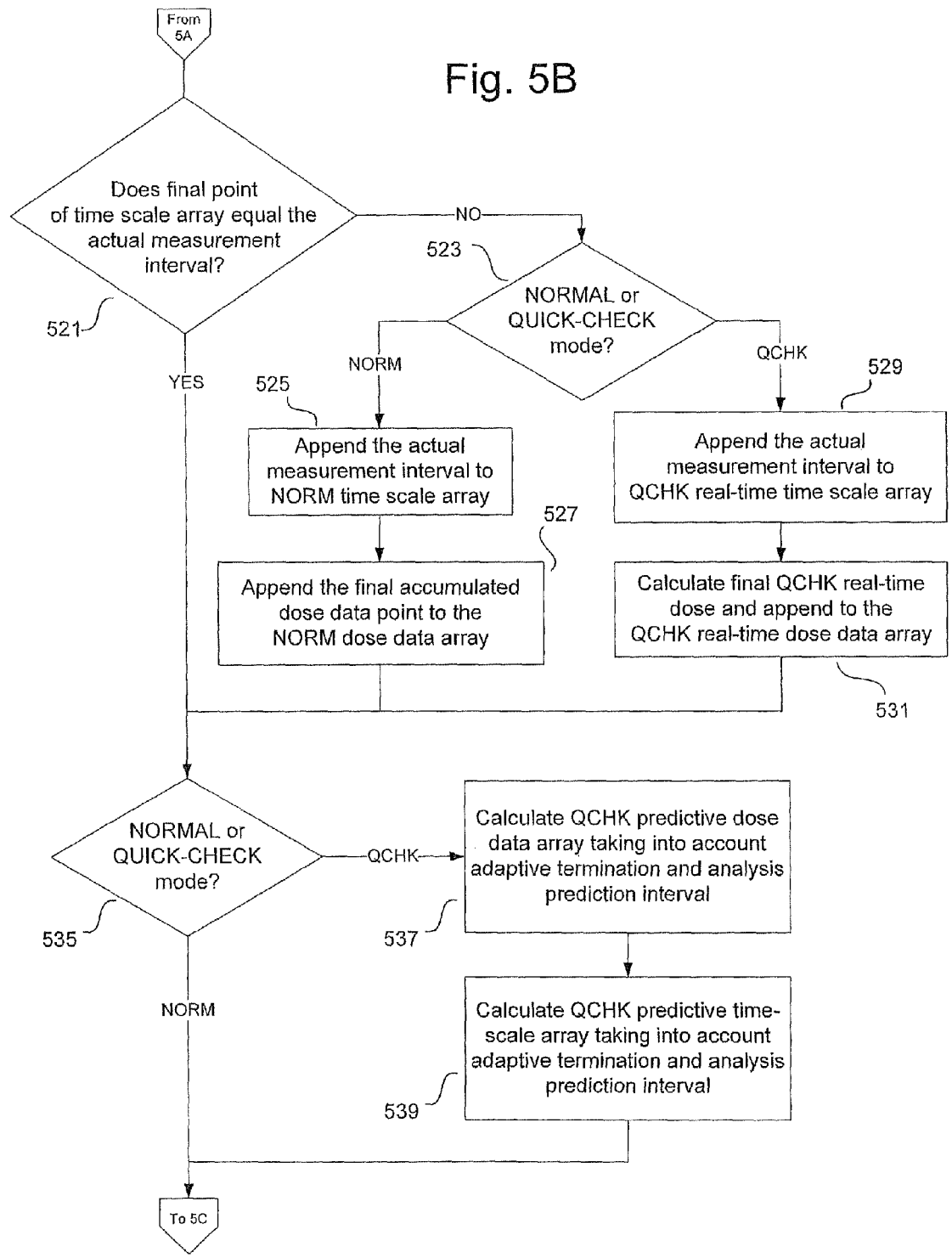

890
Fig. 8B
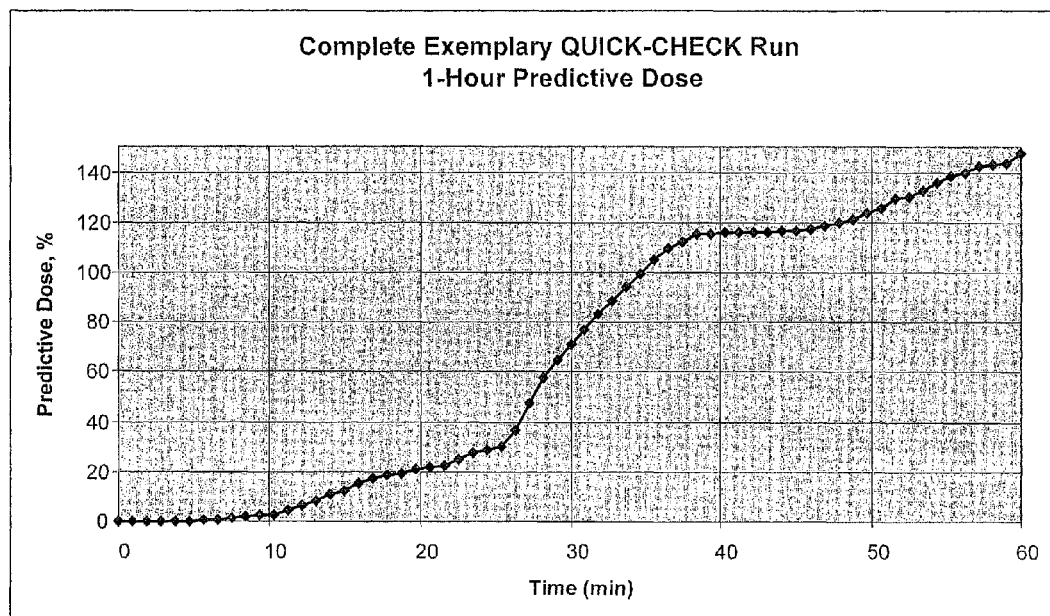
Complete Exemplary QUICK-CHECK Run
1-Hour Predictive Dose
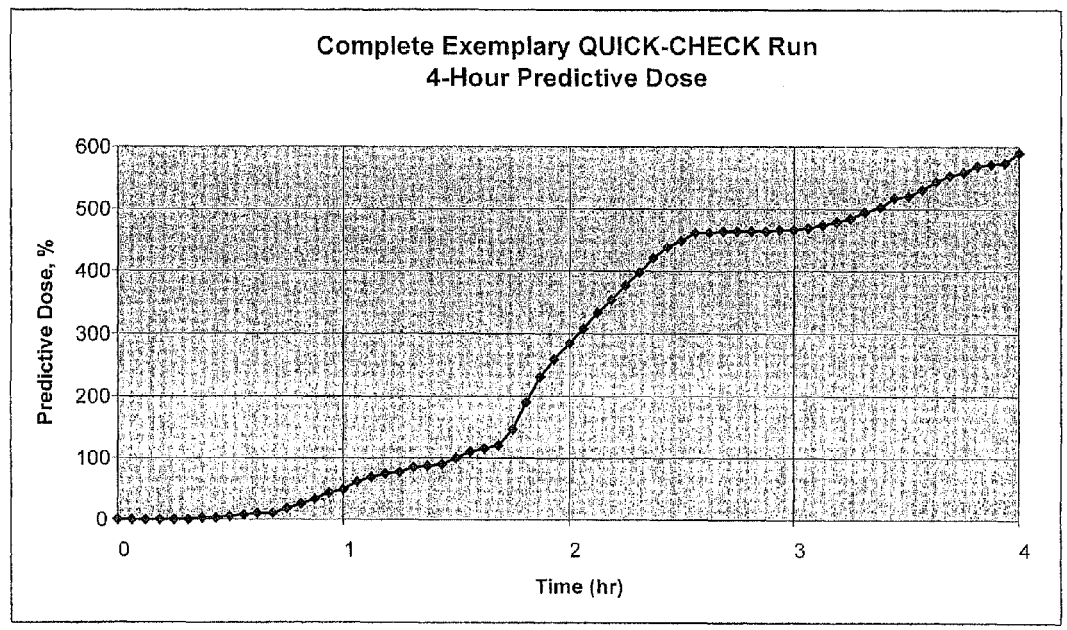
Complete Exemplary QUICK-CHECK Run
4-Hour Predictive Dose
895
Fig. 8C

METHOD AND SYSTEM FOR PREDICTING LONG-TERM EXPOSURE TO A HAZARDOUS ENVIRONMENT

CROSS-REFERENCE TO RELATED APPLICATIONS/INCORPORATION BY REFERENCE

The present application is a continuation-in-part and claims priority under 35 U.S.C. §120 to U.S. Patent Application Ser. No. 11/654,419, filed on Jan. 17, 2007, which is a continuation-in-part of U.S. Applicant Ser. No. 11/643,328, filed on Dec. 20, 2006. U.S. Patent Applicant Ser. No. 11/654,419 claims priority under 35 U.S.C. §119(e) to provisional application Ser. No. 60/759,460, filed on Jan. 17, 2006, and provisional application Ser. No. 60/760,564, filed on Jan. 20, 2006. U.S. Patent Application Ser. No. 11/643,328 claims priority under 35 U.S.C. §119(e) to provisional application Ser. No. 60/752,761, filed on Dec. 20, 2005. The entire contents of each prior-filed application are hereby expressly incorporated herein by reference.

FIELD OF THE INVENTION

Certain embodiments of the invention relate to monitoring exposure to a hazardous environment, for example, radiation, chemical vapors, and/or noise, among other things. More specifically, certain embodiments of the invention relate to a method and system for a hazard dosimeter with capability to rapidly predict long-term hazard exposure based on a user-controllable measurement interval of short duration.

BACKGROUND OF THE INVENTION

A dosimeter is a device generally used to measure exposure to a hazardous environment, particularly when the hazardous impact is cumulative over long intervals of time. With regard to noise, for example, a noise dosimeter is a device which incorporates a sound level measurement subsystem and a methodology for integrating or accumulating the sound level over time. ANSI S1.25-1991 is the current American National Standard Specification for Personal Noise Dosimeters, a comprehensive document that describes how a standard noise dosimeter should function. A calculable result of noise dose measurement over time may be what is known as the "equivalent continuous sound level", denoted as Leq. A noise dose might also be expressed as a percentage of "criterion exposure." The "criterion sound level", for example 85 dB, is the level of sound, which having been applied continuously for a duration equal to the "criterion time," typically 8 hours, results in a 100% criterion exposure. These calculations are completely specified in the standard and are well known in the industry.

Many environments expose individuals to excessively loud sounds. These loud sounds may occur at, for example, music concerts, industrial manufacturing environments, construction and environments involving the use of heavy machinery, etc. The US government regulates, through OSHA (Occupational Safety and Health Administration), noise exposure levels in work environments. There are many noise dosimeters on the market, which are used to monitor noise in the work environment. These regulations and devices represent a level of protection for many American workers.

There are other environments, in which loud noises exist, that are far less regulated. Therefore, the development of a low cost noise dosimeter is needed to provide individuals or organizations with an inexpensive and simple means of monitoring noise exposure.

Existing devices used for measuring noise exposure have several problems. For example, existing devices tend to be too complicated for operation by the average user, and they are generally too expensive for the average user, in that they are primarily designed for use by technically trained personnel in an industrial environment, which is reflected in their cost and complexity. Further, existing devices can be inappropriate to wear in most social occasions and situations and may also have insufficient accuracy, precision and/or flexibility. Additionally, existing devices are designed for use over an extended period of time, e.g. an entire workday, and cannot rapidly predict noise exposure in situations where the listener is exposed to sound that is of a similar nature for an extended period, such as a music concert.

In addition to sound or noise dosimeters, other types of dosimeters include radiation dosimeters, which measure exposure to ionizing radiation such as x-rays, ultraviolet light, or electromagnetic fields, and chemical vapor dosimeters. X-ray radiation cannot be detected by the senses, so workers who may be exposed to such radiation are often required to wear dosimeters so their employers can keep a record of their exposure and verify that it is below legally prescribed limits.

Further limitations and disadvantages of conventional and traditional approaches will be apparent to one of skill in the art through comparison of such systems with some aspects of the present invention as set forth in the remainder of the present application with reference to the drawings.

BRIEF SUMMARY OF THE INVENTION

Certain embodiments of the present invention provide a system and method for predicting long-term exposure to a hazardous environment based on a user-controllable measurement interval of short duration. In an embodiment, the system includes an electronic circuit for receiving one or more signals representative of the level of a hazard in an environment using one or more of a hazard level sensor and a direct input jack. The system further includes a processor within the electronic circuit for determining an accumulated dose over a user-controllable measurement interval. In addition, the processor predicts hazardous exposure for a user-settable extended period greater than the user-controllable measurement interval and based on the accumulated dose. The dosimeter also includes a user-operable switch within the electronic circuit and in communication with the processor for controlling the user-controllable measurement interval to be less than a nominal measurement interval.

Certain embodiments of a method for predicting hazard exposure include receiving one or more signals representative of a level of a hazard in an environment. The method also includes determining an accumulated dose over a user-controllable measurement interval. In an embodiment, the user-controllable measurement interval is less than a nominal measurement interval. In addition, the method also includes predicting a hazardous exposure for a user-settable extended period greater than the user-controllable measurement interval and based on the accumulated dose.

Certain embodiments of a computer-readable storage medium include a set of instructions for a computer. In certain embodiments, the set of instructions include a receiving routine for receiving one or more signals representative of a level of a hazard in an environment. The set of instructions also include a determination routine for determining an accumulated does over a user-controllable measurement interval. In an embodiment, the user-controllable measurement interval is less than a nominal measurement interval. In addition, the set of instructions also include a prediction routine for predicting a hazardous exposure for a user-settable extended period greater than the user-controllable measurement interval and based on the accumulated dose.

These and other advantages, aspects and novel features of the present invention, as well as details of an illustrated embodiment thereof, will be more fully understood from the following description and drawings.

BRIEF DESCRIPTION OF THE DRAWINGS

FIG. 5B illustrates a flow chart of a second part of an exemplary method for analyzing data received from a dosimeter in NORMAL or QUICK-CHECK mode, in accordance with an embodiment of the present invention.

FIG. 8B illustrates exemplary QUICK-CHECK mode 1 hour predictive dose data as displayed by a computer in accordance with an embodiment of the present invention, wherein the QUICK-CHECK run was not terminated early.

FIG. 8C illustrates exemplary QUICK-CHECK mode 4 hour predictive dose data as displayed by a computer in accordance with an embodiment of the present invention, wherein the QUICK-CHECK run was not terminated early

Figure 1:
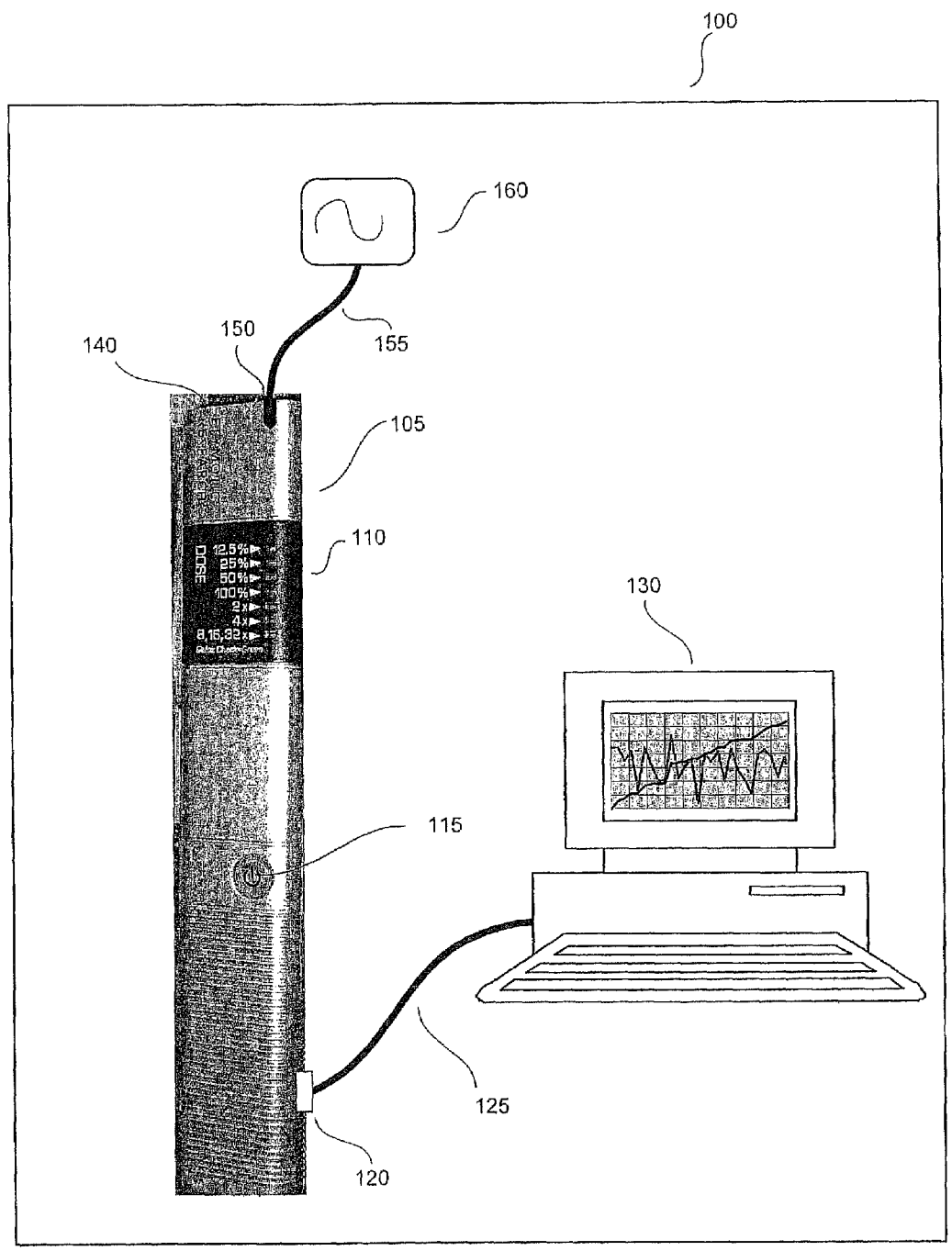
FIG. 1 illustrates an exemplary dosimeter system, in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

FIG. 1 illustrates an exemplary dosimeter system 100 in accordance with an embodiment of the present invention. Dosimeter 105 may be a noise dosimeter or may be another type of dosimeter, such as, for example, a radiation dosimeter or a chemical vapor dosimeter. Dosimeter 105 comprises, among other things, display 110, user-operable pushbutton 115, data communications connector 120, direct electrical input connector 150 and sensor 140. Data communications connector 120 allows the dosimeter to optionally communicate with a computer 130 via cable 125, for example. Sensor 140 may be a microphone, radiation sensor, or chemical vapor sensor, among other things.

Data communications between dosimeter 105 and computer 130 may provide a user with the capability to, for example, download dose data; delete dose data; display real-time dose data and Leq; display predictive dose data; display run details, for example final dose, run length, error messages, and the like; display and modifying measurement settings, such as, in the case of noise dose measurement, the exchange rate, criterion level and/or threshold level; display and modify the nominal NORMAL or QUICK-CHECK measurement intervals; display and modify the predictive measurement interval for QUICK-CHECK mode; display and modify general settings, such as the behavior of the display and/or user controls; generate standardized reports; generate raw data files for use by researchers or others; upgrade dosimeter firmware; create and modify user-defined notes; display dosimeter information such as manufacture date and serial number; and calibrate the dosimeter, among other things.

As illustrated in FIG. 1, data communications between dosimeter 105 and computer 130 is implemented as a wired connection. Wire-connected interfaces which may be used include serial, parallel, USB (Universal Serial Bus), FireWire, and others known to those having ordinary skill in the art. A wireless interface may also be used in an embodiment of the invention.

Direct electrical connector 150 may be used in lieu of sensor 140 to provide a hazardous exposure signal to dosimeter 105. In a preferred embodiment, if direct electrical input cable 155 is attached, the dosimeter 105 processes the signal provided to it by electrical input device 160 rather than the signal provided by sensor 140. Electrical input may be in the form of a data stream or analog signal representing hazardous exposure over time. In the case of noise dosimetry, electrical input device 160 may be, for example, a music player or a microphone external to dosimeter 105.

Certain embodiments of the present invention predict exposure to a hazard based on a short-term measurement. An embodiment comprises both a measurement device or dosimeter 105 and a data analysis tool 130. The dosimeter 105 may be a hand-held instrument with a built-in sensor 140 for measurement of some form of hazardous exposure, such as sound, radiation and/or chemical vapors, among other things. The data analysis tool 130 may be a computer with a data communication interface for communicating with the dosimeter and software for analysis of data read from the dosimeter 105.

The dosimeter 105 may comprise a user-operable switch 115 for initiating the measurement process and a timer to terminate the measurement process after a predetermined measurement interval has passed. The user-operable switch 115 may also be utilized to terminate the measurement process before the predetermined measurement interval has completed.

A possible mode of operation of a dosimeter designed according to the present invention, referred to herein as the NORMAL mode, has been described in copending application Ser. No. 11/654,419, which is hereby expressly incorporated herein by reference. Without user intervention, the NORMAL mode of operation measures and displays the hazardous exposure during a predetermined interval of time, referred to herein as the nominal NORMAL measurement interval, for example, 16 hours. In a preferred embodiment of the present invention, the NORMAL mode of operation may be terminated by the user prior to the completion of the predetermined nominal NORMAL measurement interval. Thus, for example, if a NORMAL mode measurement that would normally terminate after 16 hours is terminated after a typical work day, for example after 9 hours, the actual NORMAL measurement interval would then be 9 hours, rather than the nominal 16 hours. In such a case, the dosimeter displays the dose accumulated from the start of the measurement until it was terminated at 9 hours according to standard noise dose calculations such as described in ANSI S1.25-1991.

An embodiment of the present invention allows the user to change the nominal NORMAL measurement interval by altering settings within the dosimeter 105. The dosimeter settings may be altered, for example, using a dosimeter user interface (e.g., pushbutton 115) or computer 130 via connection 125, among other things.

Another mode of operation of the dosimeter 105, referred to herein as QUICK-CHECK mode, has also been described in copending application Ser. No. 11/654,419. Unlike NORMAL mode operation, QUICK-CHECK measures for a relatively short duration of time, referred to herein as the nominal QUICK-CHECK measurement interval and predicts the hazardous dose which would occur for exposure over a significantly longer period of time, referred to herein as the dosimeter prediction interval. An exemplary nominal QUICK-CHECK measurement interval described in copending application Ser. No. 11/654,419 is 112.5 seconds or 1/32 of an hour. An exemplary dosimeter prediction interval described in copending application Ser. No. 11/654,419 is 1 hour, or 32 times greater than the described nominal QUICK-CHECK measurement interval of 112.5 seconds.

An embodiment of the present invention allows the user to change the nominal QUICK-CHECK measurement interval and/or the dosimeter prediction interval by altering settings within the dosimeter 105. The dosimeter settings may be altered, for example, using a dosimeter user interface (e.g., pushbutton 115) or computer 130 via connection 125, among other things. The ratio of the dosimeter prediction interval to the nominal QUICK-CHECK measurement interval in the present invention may or may not be an integer.

In a preferred embodiment of the invention, the user may terminate a QUICK-CHECK measurement prior to the end of the predetermined nominal QUICK-CHECK measurement interval. When this is the case, referred to herein as adaptive termination, the predicted dose calculation adapts according to the duration of the actual QUICK-CHECK measurement interval. When adaptive termination of a QUICK-CHECK measurement is utilized, although the actual QUICK-CHECK measurement interval is less than the predetermined nominal QUICK-CHECK measurement interval, the dosimeter prediction interval remains unchanged and thus the ratio of dosimeter prediction interval to actual QUICK-CHECK measurement interval changes.

Adaptive termination of a QUICK-CHECK mode measurement in the present invention is distinct from the behavior described in copending application Ser. No. 11/654,419 wherein early termination of a QUICK-CHECK mode run causes the dosimeter prediction interval to change, maintaining the ratio between the dosimeter prediction interval and the QUICK-CHECK measurement interval. Thus, for example, as described in copending Ser. No. 11/654,419, in a dosimeter with a nominal QUICK-CHECK measurement interval of 112.5 seconds and a dosimeter prediction interval of 1 hour, were a QUICK-CHECK run terminated at 56.25 seconds, the dosimeter prediction interval would be changed to 30 minutes.

To better facilitate understanding of the present invention and its various embodiments, below is a table of terms with definitions as used throughout this specification:

TABLE 1

| | |
|---|---|
| NORMAL mode | Operational mode of dosimeter which measures hazardous exposure during a predetermined interval of time |
| nominal NORMAL measurement interval | Predetermined interval of time over which NORMAL mode operation measures hazardous exposure, except in cases where user terminates measurement prior to completion of this predetermined interval of time. Exemplary value: 16 hours |
| actual NORMAL measurement interval | Interval of time over which NORMAL mode operation measures hazardous exposure. Cannot exceed nominal NORMAL measurement interval and equals nominal NORMAL measurement interval in cases where user does not terminate measurement prior to completion of the nominal NORMAL measurement interval. Exemplary value: 8.5 hours |

TABLE 1-continued

| | |
|---|---|
| QUICK-CHECK mode | Operational mode of dosimeter which measures hazardous exposure for a predetermined relatively short duration of time and based on that short-duration measurement predicts dose which would occur for exposure during a significantly longer period time. |
| nominal QUICK-CHECK measurement interval | Predetermined relatively short duration of time over which QUICK-CHECK mode operation measures hazardous exposure, except in cases where user terminates measurement prior to completion of this predetermined short duration. Exemplary value: 112.5 seconds |
| actual QUICK-CHECK measurement interval | Interval of time over which QUICK-CHECK mode operation measures hazardous exposure. Cannot exceed nominal QUICK-CHECK measurement interval and equals nominal QUICK-CHECK measurement interval in cases where user does not terminate measurement prior to completion of the nominal QUICK-CHECK measurement interval. Exemplary value: 30 seconds |
| adaptive termination | Describes process which takes place when a QUICK-CHECK measurement is terminated prior to completion of the nominal QUICK-CHECK measurement interval. |
| dosimeter prediction interval | For QUICK-CHECK mode, the period of time for which exposure is predicted by the dosimeter based upon a measurement of significantly shorter duration. Exemplary value: 1 hour |
| analysis prediction interval | For QUICK-CHECK mode data analysis, an alternative period of time for which exposure is predicted based upon a measurement of significantly shorter duration. The analysis prediction interval may or may not be equal to the dosimeter prediction interval. Exemplary value: 8 hours |
| incremental dose | A hazardous dose value computed periodically by considering only the exposure which took place during the preceding brief interval of time, for example $2^{-14}$ second. |
| accumulated dose | The sum of all incremental dose computations since the beginning of a measurement. |
| predictive dose | For QUICK-CHECK mode, a dose value which takes into consideration the prediction interval and is based upon all of the incremental dose values since the beginning of a measurement. |
| accumulated dose data array | The array of accumulated dose values which represents the entire measurement. |
| NORM dose data array | The array of accumulated dose values, beginning with 0, which represents an entire NORMAL mode measurement. |
| NORM time scale array | The array of time values, beginning with 0 and ending with the actual NORMAL measurement interval, which correspond to the NORM dose data array values. |
| QCHK real-time dose data array | The array of accumulated dose values, beginning with 0, which represents an entire QUICK-CHECK mode measurement wherein these values do not take into account any predictive calculations. |
| QCHK real-time time scale array | The array to time values, beginning with 0 and ending with the actual QUICK-CHECK measurement interval, which correspond to the QUICK-CHECK real time dose data array values. |
| QCHK predictive dose data array | The array of accumulated dose values, beginning with 0, which represents an entire QUICK-CHECK mode measurement, wherein these values take into account all predictive calculations. |
| QCHK predictive time scale array | The array of time values, beginning with 0 and ending with the prediction interval value, which represents an entire QUICK-CHECK mode measurement, wherein these values take into account the prediction interval value. |

In an embodiment, QUICK-CHECK mode may be applied to any measurement process which involves some sort of integration or accumulation over time of a measured quantity. An example herein is that of noise dose measurement, which integrates a value based upon sound level over a measurement interval. Doubling the measurement interval doubles the dose, provided the measured parameter is stationary or constant over the measurement interval. According to ANSI S1.25-1991, for noise exposure, there is a linear relationship between measurement interval and dose for stationary signals: double the time yields double the dose. Although linearity simplifies the calculations, in an embodiment of the present invention, linearity is not a requirement. Rather, the relationship between dose and measurement interval for stationary signals may be known and calculable.

In an embodiment, if exposure is at or close to a fixed level over a long period of time, it is both simple and reliable to predict long-term exposure based upon a short measurement duration. However, not all exposure is at or near a fixed level over time. The prediction accuracy of QUICK-CHECK mode is greater if the actual measurement interval is representative of the exposure that would occur over the dosimeter prediction interval. For example, running QUICK-CHECK mode while most or all of a typical song is being played provides, with useful accuracy, the noise dose which results from being exposed to an entire concert of such songs.

The aforementioned data analysis tool 130 may provide, for example, the following system capabilities: downloading dose data; deleting dose data; displaying real-time dose data and Leq; displaying predictive dose data; displaying run details, for example final dose, run length, error messages, and the like; displaying and modifying measurement settings, such as, in the case of noise dose measurement, the exchange rate, criterion level and/or threshold level, all of which are described in ANSI S1.25-1991; displaying and modifying the nominal NORMAL or QUICK-CHECK measurement intervals; displaying and modifying the predictive measurement interval for QUICK-CHECK mode; displaying and modifying general settings, such as the behavior of the display and/or user controls; generating standardized reports; generating raw data files for use by researchers or others; upgrading dosimeter firmware; creating and modifying user-defined notes; displaying dosimeter information such as manufacture date and serial number; and dosimeter calibration, among other things.

Figure 2:
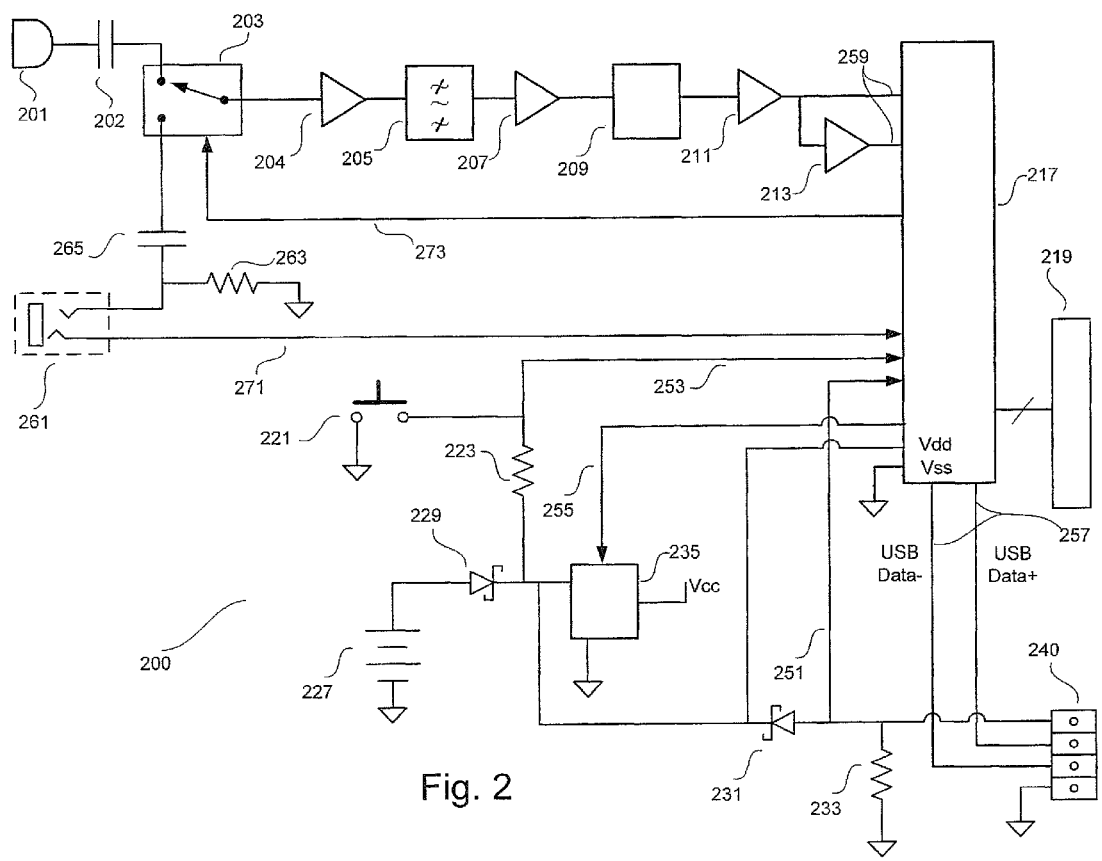
FIG. 2 illustrates a block diagram of exemplary circuitry of an exemplary noise dosimeter, in accordance with an embodiment of the present invention.

FIG. 2 illustrates a block diagram of an exemplary dosimeter system 200, in accordance with an embodiment of the present invention. The dosimeter system 200 comprises a sensor 201, which in the case of noise dosimetry may be a microphone, a filter 205, a detector 209, a microcontroller 217, a power source 227, a pushbutton 221, and a display 219. The system may additionally comprise several amplifiers 204, 207, 211, and 213, a voltage regulator 235, and other components as described herein, among other things.

The power source 227 may be, for example, batteries. In an embodiment of the present invention, three AMA alkaline batteries are used as the power source 227. These batteries may provide the dosimeter with battery life as long as 200 hours of continuous use.

The microcontroller 217 comprises program memory, data memory, an analog to digital converter, timers, a clock oscillator, and various lines for input and output. The program memory may contain dosimeter firmware, for example, that may operate the dosimeter and perform computations.

Microcontroller 217 controls display 219 which may comprise, for example, a number of LEDs (light emitting diodes). A pattern of blinking or duration of the LEDs may be indicative of different activities and functionalities occurring in the noise dosimeter such as, for example, an error. Alternatively, display 219 may be another form of display, such as a liquid-crystal type display, for example.

Sensor 201 provides the dosimeter with a signal indicative of hazardous exposure and may be a microphone, an X-ray radiation sensor, a sensor of electromagnetic radiation, a chemical vapor sensor, or some other form of sensor applicable to the measurement of hazardous exposure. In a preferred embodiment, an alternative input is provided via direct electrical input connector 261. Coupling capacitor 202 is connected between the output signal line of sensor 201 and a first input terminal of single-pole double-throw (SPDT) analog switch 203. Coupling capacitor 265 is connected between the signal input of connector 261 and a second input terminal of SPDT analog switch 203. The common pole of analog switch 203 is connected to input amplifier 204, thus providing the dosimeter with a signal for further processing. The microcontroller 217 may either select the sensor 201 or the connector 261 as the input source for the dosimeter via digital output line 273, which controls analog switch 203.

Input connector 261 may be used, for example, with a sensor which is external to the dosimeter or with a playback device used to log hazardous levels and is subsequently connected to the dosimeter 105 via input connector 261. In the case of noise dosimetry, a music player such as an iPod or the like may be connected to dosimeter 105 via input connector 261. Load resistor 263 is connected between the signal input of connector 261 and ground and may provide a standard load for an externally connected source. In one embodiment of the invention, resistor 263 is 600Ω. In FIG. 1, the signal supplied via input connector 261 is an analog signal; however those having ordinary skill in the art will understand that with suitable changes to the circuitry of dosimeter 105, a digital signal may alternatively be provided.

As illustrated in FIG. 1, input connector 261 may be a 3-contact jack, for example, a stereo ⅛" jack. The tip connection of input connector 261 may be the signal input and the ring connection may be used to inform microcontroller 217 that an external input has been attached to the dosimeter 105. Microcontroller digital input line 271 is connected to the ring connection of the input connector 261 and in a preferred embodiment, the mating plug that is attached to connector 261 has its ring grounded. Thus, the system may be configured such that microcontroller 217 is responsive to the attachment of the external signal at connector 261 and subsequently select the external input signal via its digital output line 273.

In one embodiment, filter 205, which receives its input signal from amplifier 204, may be passive filter designed to provide necessary signal filtering. In an embodiment designed for noise dosimetry, filter 205 provides, in conjunction with amplifiers 204 and 207 and other components, the frequency weighting specified in ANSI S1.25-1991, which is commonly referred to as A-weighting. Other frequency weightings may be employed for use in applications other than standard noise dosimetry.

The output of filter 205 is connected to the input of amplifier 207. The output of amplifier 207 is connected to the input of detector 209. Detector 209 may be an RMS detector, which converts an AC signal at its input to a slow-moving DC output signal at a level equal to the root-mean square value of the input. Alternatively, a different form of detector may be employed depending on the application and the nature of the sensor 201 or the signal at input connector 261.

In an embodiment of the invention for use in noise dosimetry, detector 209 is an RMS detector which converts the filtered AC signal at its input into appropriately timeweighted root-mean-square DC at its output. The output of detector 209 is connected to amplifier 211. For example, RMS detector, model LTC1966 manufactured by Linear Technology may be utilized. The time-weighting requirements for noise dosimetry are also well-documented and well-understood by those having ordinary skill in the art. Time-weighting other than that specified in ANSI S1.25-1991 may be employed, depending on the application. In some forms of dosimetry, some other form of detection other than RMS detection may be required. In yet other forms of dosimetry, detector 209 may not be required. Alternatively, in an embodiment of the invention, microcontroller 217 may provide the detection function and thus detector 209 may not be required.

Amplifiers 211 and 213 are DC amplifiers that provide outputs to multiplexed inputs 259 of an analog-to-digital converter, which can selectively sample either the output of amplifier 211 or the output of amplifier 213. Copending application Ser. No. 11/643,328 describes representative RMS detection and analog-to-digital conversion that may be employed in the present invention.

The dosimeter may measure in NORMAL mode or QUICK-CHECK mode. Further, the dosimeter may operate under computer 130 control. Referring again to FIG. 2, data communications via connector 240 may be, for example, USB communication. USB interfaces generally include a low-power source of approximately 5 volts which may be used to power the connected device. In the case of USB, microprocessor 217 can detect the presence of a data communications interface cable at connector 240 by looking for USB power at input line 251. Pull-down resistor 233 ensures that the microcontroller 217 does not wrongly assume that USB is connected when the cable is not plugged in. This and other techniques of managing USB presence and using USB power in a connected device are well-known to those having ordinary skill in the art.

Preferably, microcontroller 217 includes integral USB interface hardware and may be, for example, the PIC18LF4550 manufactured by Microchip Technologies, Chandler, Ariz.

The presence of diodes 229 and 231 allow the dosimeter to be powered either by the USB power at line 251 or power source 227. The cathodes of both diodes 229 and 231 are connected together and directly power the microcontroller 217 (Vdd). Vdd is input to voltage regulator 235, which can be either enabled or disabled via microcontroller digital output line 255.

Alternatively, data communications may be implemented via a FireWire connection or some other form of interface. Preferably, the dosimeter can be designed in a way which allows it to be aware of when the computer interface is attached. This can be accomplished in various ways, as known to those having ordinary skill in the art.

Pushbutton 221 is connected to microcontroller 217 via input line 253. Pull-up resistor 223 ensures that the state of pushbutton 221 is properly detected. In some microcontrollers, the pull-up resistor is integral and thus resistor 223 is not needed.

Operation in NORMAL mode may be initiated by pressing and releasing the pushbutton 221 and may be carried out by the user of the noise dosimeter. Operation in QUICK-CHECK mode may be initiated by pressing and holding the pushbutton 221 for a few seconds, then releasing it.

In a preferred embodiment of the invention, in order to prevent inadvertent overwrite of stored dosimeter data, pressing and releasing pushbutton 221 initiates a self-check routine and does not start a measurement. In that embodiment, pressing and releasing pushbutton 221 twice in succession starts a NORMAL mode measurement and pressing and releasing pushbutton 221 three times starts a QUICK-CHECK mode measurement.

Figure 3:
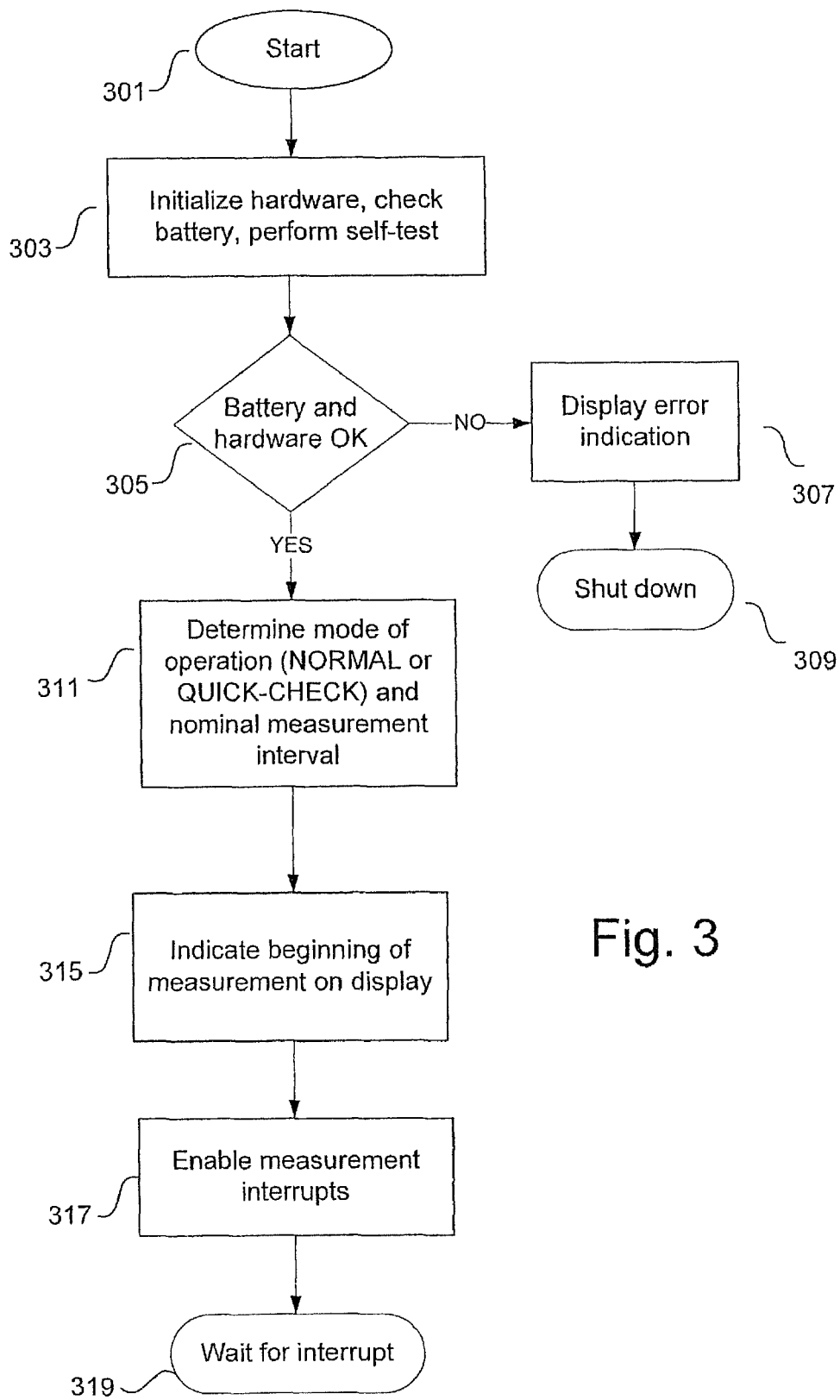
FIG. 3 illustrates a flow chart of an exemplary noise dosimeter startup sequence, in accordance with an embodiment of the present invention.

FIG. 3 illustrates a flow chart of an exemplary noise dosimeter startup sequence, in accordance with an embodiment of the present invention. This flow chart is limited to either NORMAL or QUICK-CHECK startup and does not attempt to detail how the pushbutton 221 activity initiates various modes. Nor does this flow chart detail the detection of a computer interface connection. Microcontroller programming details concerning USB or other forms of data interface connection as well as microcontroller programming details concerning detection of pushbutton activity are well-known to those having ordinary skill in the art.

At step 301 the dosimeter startup begins. This may be initiated by pressing pushbutton 221 one or more times. At step 303, the microcontroller 217 initializes hardware, checks the battery health and performs other self-test functions and then, at step 305, a determination is made whether the dosimeter can proceed to make a measurement. If a problem with the batteries 227 and/or hardware is detected, an error indication is displayed at step 307 and the dosimeter shuts down at step 309.

Provided the batteries and hardware are in working order, the dosimeter 105 next determines at step 311 the mode of operation and nominal measurement interval of the upcoming run. The upcoming run may be, for example, a 16 hour NORMAL mode run or a 112.5 second QUICK-CHECK run.

At step 315, the beginning of the measurement is indicated on the display. This may be a predetermined pattern or sequence of LEDs which varies according to the mode.

In the embodiment illustrated by FIGS. 3, 4A, 4B and 4C, the measurement process is entirely interrupt driven with $2^{14}$ interrupts occurring every hour. This particular interrupt rate, one interrupt every approximately 220 milliseconds, bears a simple relationship to 1 hour, is rapid enough to adequately inform the user of ongoing activities and yet slow enough to allow the microcontroller to perform all necessary calculations. As will be appreciated by those having ordinary skill in the art, other interrupt rates may be selected. At step 317, the interrupts are enabled and then the dosimeter awaits its first interrupt at step 319.

Figure 4A:
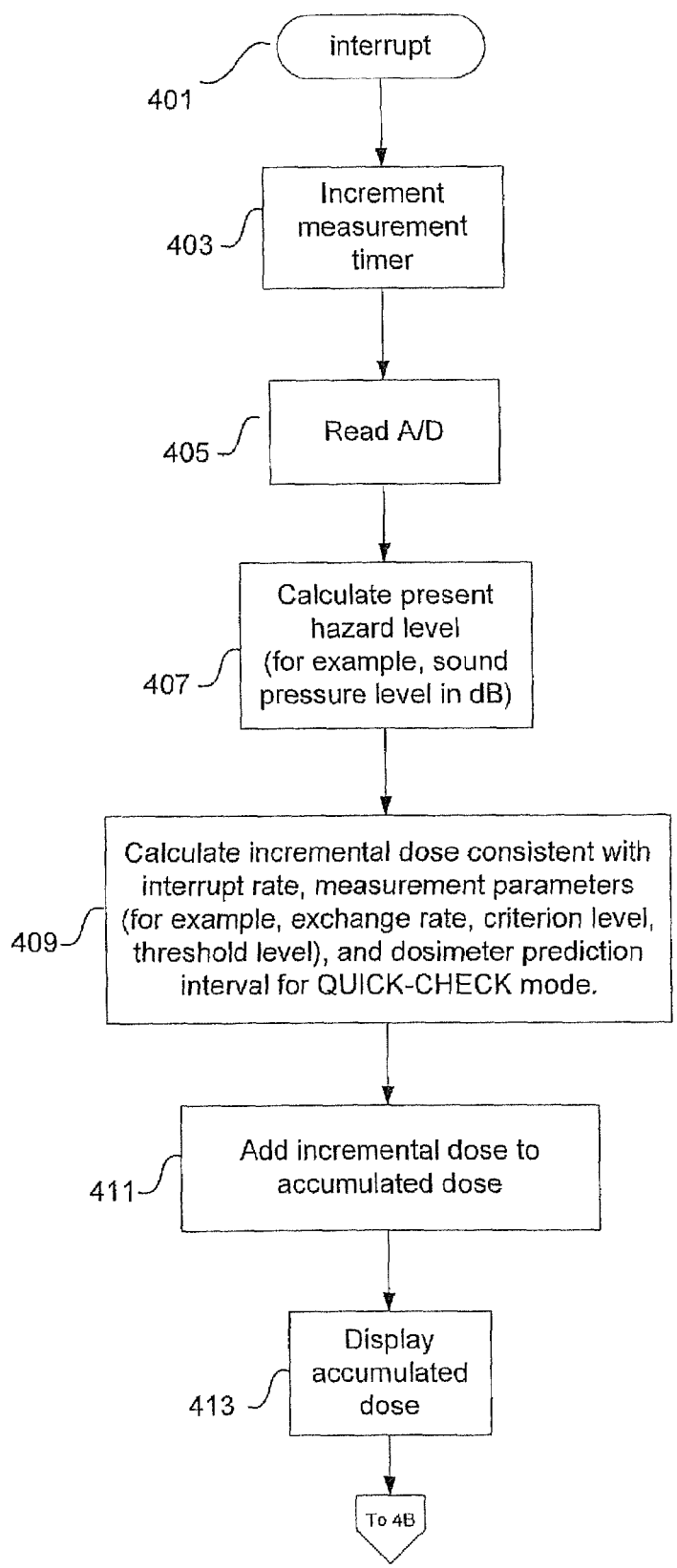
FIG. 4A illustrates a flow chart of a first part of an exemplary interrupt service method of a dosimeter in NORMAL or QUICK-CHECK mode, in accordance with an embodiment of the present invention.
Figure 4B:
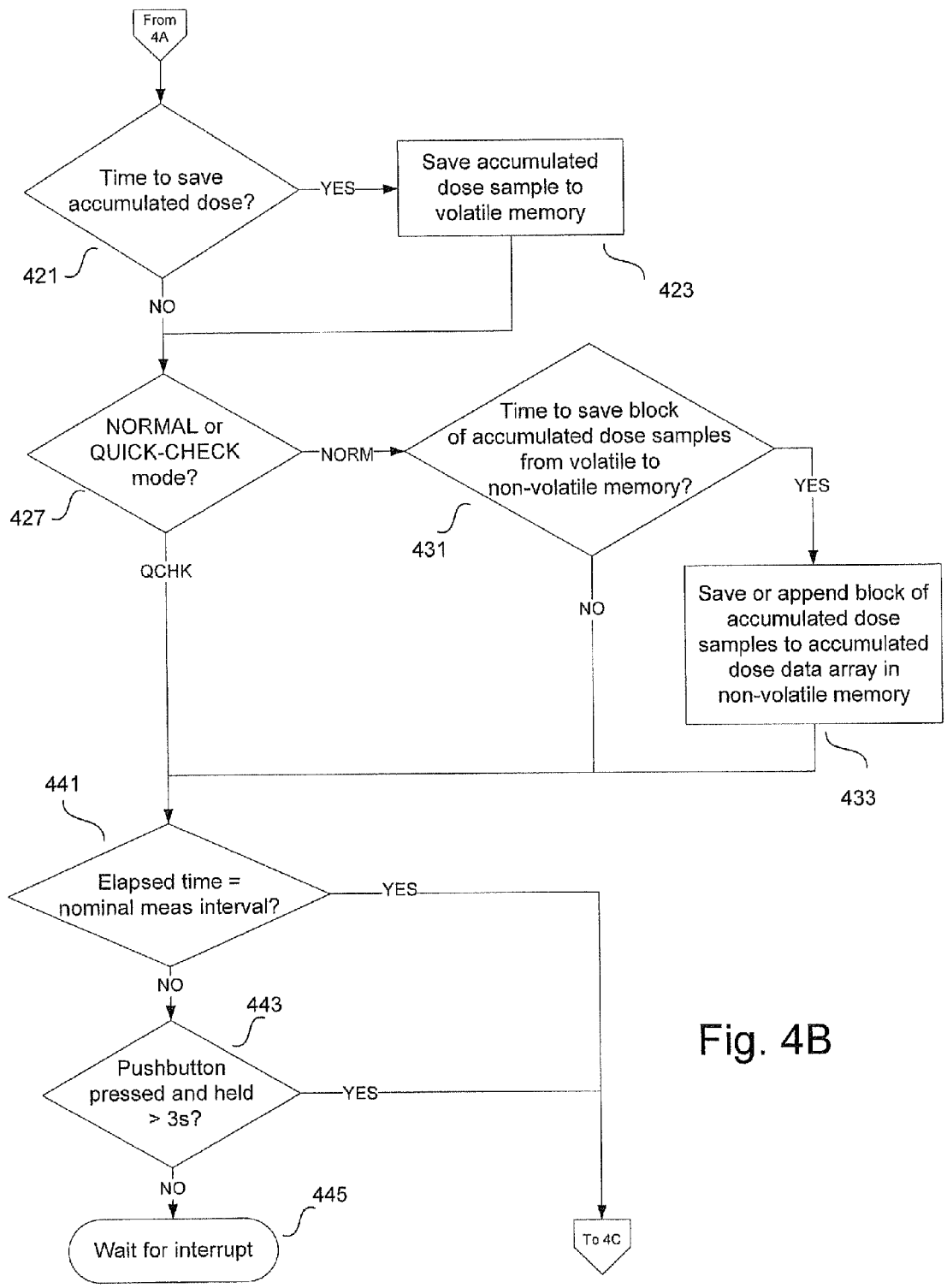
FIG. 4B illustrates a flow chart of a second part of an exemplary interrupt service method of a dosimeter in NORMAL or QUICK-CHECK mode, in accordance with an embodiment of the present invention.
Figure 4C:
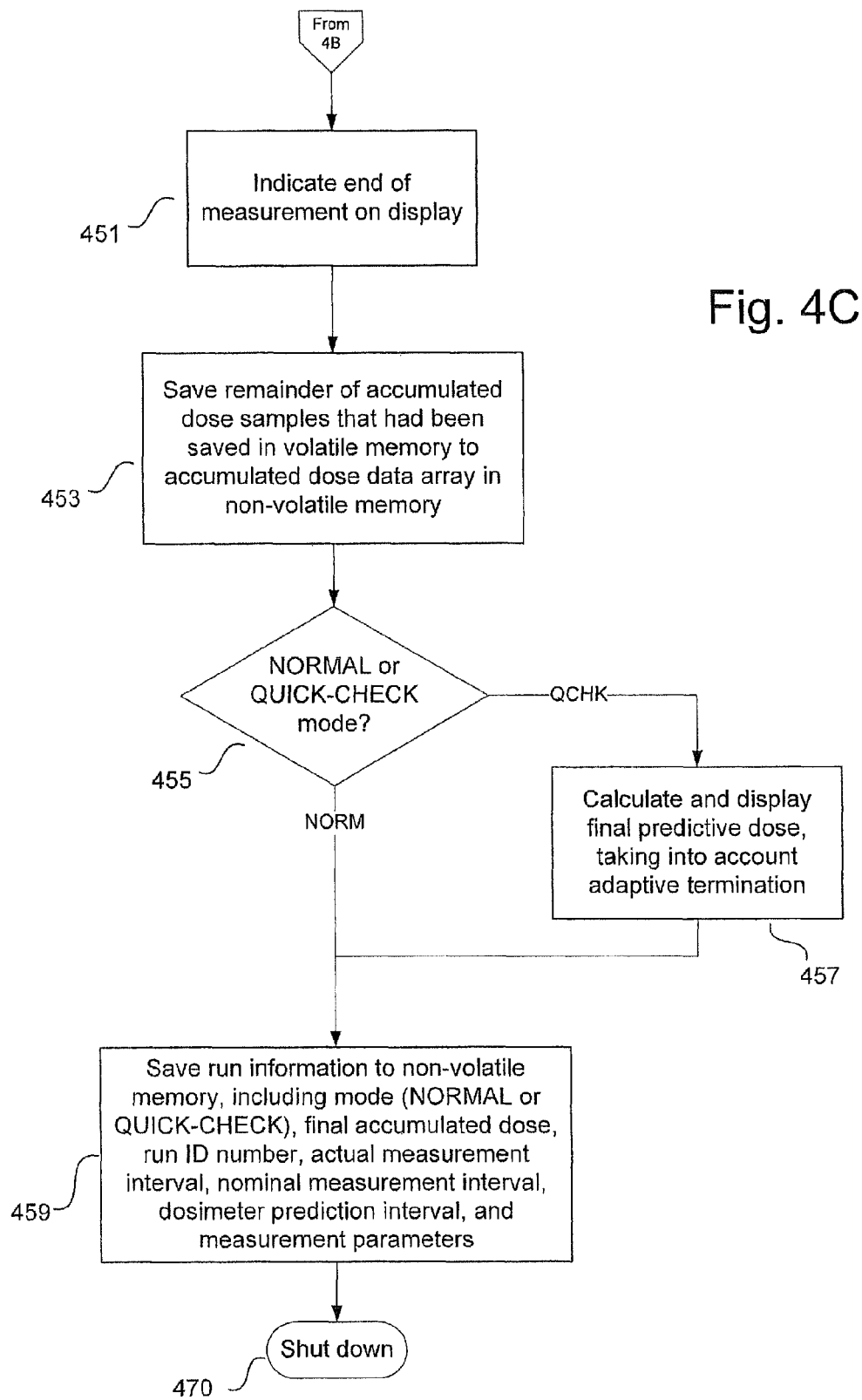
FIG. 4C illustrates a flow chart of a third part of an exemplary interrupt service method of a dosimeter in NORMAL or QUICK-CHECK mode, in accordance with an embodiment of the present invention.

FIGS. 4A, 4B, and 4C illustrate, in three parts, a flow chart of an exemplary interrupt service method of a dosimeter in NORMAL or QUICK-CHECK mode, in accordance with an embodiment of the present invention. For illustrative purposes, the flow chart illustrates an interrupt service method applicable to noise dosimetry. In the discussion below, reference is made to other forms of dosimetry, and it will be appreciated by those having ordinary skill in the art that the method shown in FIGS. 4A, 4B, and 4C can be modified as required to perform dosimetry calculations appropriate to forms of dosimetry other than noise dosimetry.

During the NORMAL and QUICK-CHECK modes, the dosimeter determines the present hazard level, which in the case of noise dosimetry may be sound pressure level in decibels, and then calculates the ongoing cumulative noise dose frequently, for example, once every approximately 220 milliseconds. The display may show % dose according to some standard measurement procedure, such as ANSI S1.25-1991 for noise dosimetry. Various dosage levels may be indicated by display 219 during the measurement process.

With reference to FIG. 4A, at step 401 an interrupt occurs and the dosimeter's interrupt service method is initiated. In one embodiment of the invention, the nominal NORMAL measurement interval is 16 hours and the nominal QUICK- CHECK measurement interval is 112.5 seconds. In a preferred embodiment, the interrupt rate corresponds to $2^{14}$ interrupts per hour and thus $2^{18}$ interrupts occur during a NORMAL mode measurement that is not terminated early and 512 interrupts occur during a QUICK-CHECK mode measurement that is not terminated early.

The internal measurement timer is incremented at step 403. This measurement timer is thus incremented once per interrupt and allows the microcontroller to keep track of the overall timing of the measurement. Other timing functions, such as the duration of a pushbutton press, may also use the measurement timer or may use other timers within the microcontroller.

Steps 405, 407 and 409 read the presently-sensed level of exposure and calculate an incremental dose based upon predetermined criteria. In the case of noise dosimetry, the presently-sensed sound pressure level is converted to digital information in microcontroller 217 and an incremental noise dose, corresponding to the dose accumulated since the last interrupt, is calculated according to the ANSI specification. The specific calculations at steps 407 and 409 may vary with the type of dosimeter and may be consistent with industry standards for hazardous exposure dose determination.

At step 405, the internal analog-to-digital converter within microcontroller 217 samples the levels at its multiplexed inputs 259, thus converting into digital form a value indicative of the output of either sensor 201 or the externally supplied signal at input connector 261.

At a next step 407, the present hazard level is computed. In the case of noise dosimetry, the present sound pressure level in decibels is calculated. Calibration information is utilized at this step, as is knowledge of the relationship between the voltage levels at analog-to-digital converter input lines 259 and sound pressure level. In one embodiment, this involves calculation of the logarithm of a value based on the analog-to-digital conversion that takes place at step 405. As will be understood by those having ordinary skill in the art, the calculation at step 407 may differ depending on, among other things, the type of dosimeter, the type of sensor 201 or external signal at input connector 261, and the processing that takes place at detector 209.

The incremental noise dose is then calculated at a next step 409. This calculation is consistent with measurement parameters, interrupt rate, and dosimeter prediction interval for QUICK-CHECK mode. In the case of noise dosimetry, exchange rate, criterion level, and threshold level are all considered as part of the calculation of incremental dose at step 409, in accordance with the aforementioned ANSI S1.25-1991 specification.

In a preferred embodiment, the calculation of incremental dose in QUICK-CHECK mode differs from the calculation of incremental dose in NORMAL mode. The difference in calculation is due to the fact that QUICK-CHECK mode is a predictive measure of dose and it may be preferable to display the ongoing predicted dose, rather than the ongoing real-time dose.

Consider a nominal QUICK-CHECK measurement duration of, for example 1/32 of an hour in an embodiment where the dosimeter prediction interval is 1 hour. If the present accumulated dose display is updated after receiving each interrupt, it is reasonable to calculate the incremental dose in this case such that the ongoing predicted dose display is accurate for a 1 hour dosimeter prediction interval. Thus, the calculated value of incremental dose in this case would be 32 times that which would be calculated in NORMAL mode. As another example, for a nominal QUICK-CHECK measurement duration of 1/16 of an hour or 3.75 minutes in an embodiment where the dosimeter prediction interval is 8 hours, the calculated value of incremental noise dose in QUICK-CHECK mode would be 128 times that which would be calculated in NORMAL mode.

At a next step 411, the incremental dose is added to the accumulated dose, and then, at step 413, the present accumulated dose is displayed.

In one embodiment of the invention, there is no ongoing display of the predictive measure of dose in QUICK-CHECK mode. Rather, the final predicted dose in QUICK-CHECK is displayed when either the nominal QUICK-CHECK measurement interval has completed or the user adaptively terminates the run.

Referring now to FIG. 4B, at step 421, it is determined whether the time is right to save the present accumulated dose to memory. In a preferred embodiment of the invention, the present accumulated dose is saved to volatile memory at predetermined intervals and then at other predetermined intervals, a block of dose data is saved to non-volatile memory. It will be appreciated by those having ordinary skill in the art that knowledge of dose information over time is preferable to knowledge of only the final accumulated dose. Thus, it is preferable to save a record of accumulated noise dose samples for later download by a computer 130.

To avoid loss of data due to power loss or some other event, data may be saved to non-volatile memory. In many microcontrollers, the available non-volatile memory is flash type memory and has a limited number of erase-write cycles. This means that, if written too frequently, the non-volatile memory may become unreliable over time. Thus, as those with skill in the art will appreciate, it is not advisable in some cases to save to non-volatile memory too frequently. Further, the amount of non-volatile memory in typical microcontrollers is limited, so not every possible sample of accumulated dose may be saved. Thus, an engineering trade-off exists regarding how much and how frequently dose data is saved to non-volatile memory. This tradeoff is reflected in FIG. 4B at steps 421, 423, 427, 431 and 433, as explained below.

In an embodiment of the invention, an accumulated dose sample is saved first to volatile memory, at step 423 and then a block of accumulated dose samples are saved to non-volatile memory at step 433. In this embodiment, NORMAL accumulated dose data is saved to volatile memory once every 3.75 minutes or 16 times per hour and QUICK-CHECK accumulated dose data is saved to volatile memory once every 1/2048 of an hour (approximately once every 1.75 seconds). At step 421, based upon the whether the mode is NORMAL or QUICK-CHECK and according to predetermined criteria, a determination is made as to whether it is time to save an accumulated dose sample to volatile memory at step 423. The very first accumulated dose data point saved at step 423 during NORMAL mode operation may be an accumulation over the first 3.75 minutes of operation and is designated as Accumulated_Dose[1]. Similarly, the very first accumulated dose data point saved at step 423 during QUICK-CHECK operation may be an accumulation over the first approximately 1.75 seconds of operation and is likewise designated as Accumulated_Dose[1].

At a next step 427, the measurement mode determines whether dose data is saved to non-volatile memory. In a preferred embodiment, as illustrated in FIG. 4, for QUICK-CHECK mode measurements, dose data is saved to non-volatile memory at the end of the QUICK-CHECK run. For NORMAL mode measurements, which may be take place over many hours, due to concerns for data loss as well as limitations on the amount of volatile memory present in microcontroller 217, data is saved to non-volatile memory periodically.

At step 431, executed only during NORMAL mode runs, a determination is made as to whether it is time to save a block of accumulated dose samples to non-volatile memory. In a preferred embodiment, at step 433, a block of accumulated dose samples is saved from volatile to non-volatile memory once every 15 minutes, with a resolution of one data point every 3.75 minutes. Thus, for NORMAL mode operation, no more than 15 minutes of data may be lost due to an unexpected power loss, while an unexpected power loss during a QUICK-CHECK run may cause the entire run's data to be lost.

Because QUICK-CHECK is a short duration measurement, the loss of data in the event of a power failure is not a big problem. NORMAL runs, on the other hand, can be lengthy, in some embodiments as long as one week, so loss of data would be very inconvenient to the user. When operating in NORMAL mode, at step 431a determination is made whether it is time to save data to non-volatile memory, and, if so, at step 433 the accumulated noise dose samples are saved to non-volatile memory.

In a preferred embodiment, pressing and holding the pushbutton for longer than 3 seconds terminates a measurement before the nominal measurement interval has completed. At the next step 441, the dosimeter 105 determines whether or not the measurement is complete. If not, at step 443 a determination is made whether or not the pushbutton has been pressed and held longer than 3 seconds.

If the elapsed time is not greater than the nominal measurement interval and the pushbutton has not been pressed and held for longer than 3 seconds, the interrupt service method is complete and the dosimeter waits for the next interrupt at step 445. On the other hand, if the measurement is complete because the elapsed time exceeds the measurement interval or the pushbutton has been pressed and held, execution continues to step 451, shown in FIG. 4C.

In a preferred embodiment of the invention, QUICK-CHECK mode cannot be terminated early unless at least 15 seconds has elapsed since the start of the run. This is to prevent an adaptive predictive QUICK-CHECK result based on an extremely short actual measurement interval.

At step 451, the end of the measurement is indicated on the display. This may be the same indication that was presented on the display at step 315 at the beginning of the measurement. Then, at step 453, the remainder of accumulated dose samples that had been saved in volatile memory (step 423) are saved to non-volatile memory. As pointed out above with respect to step 427, in the particular preferred embodiment illustrated in FIGS. 3, 4A, 4B and 4C, step 453 may be the only time that dose data is saved to non-volatile memory during a QUICK-CHECK measurement.

When the dosimeter is operating in NORMAL mode, it measures exposure, calculates dose, and displays the accumulated dose in accordance with a predetermined methodology, such as ANSI S1.25-1991 in the case of noise dosimetry. While in QUICK-CHECK mode, if not terminated early by the user, the dosimeter measures exposure, calculates an ongoing predicted dose based upon a predetermined dosimeter prediction interval, accumulates the dose for a brief period, such as 1/32 of an hour or 112.5 seconds, and then displays the predicted dose as if the accumulation were for the dosimeter prediction interval, a significantly longer period, for example, 1 hour. This mode may be especially useful to quickly predict the noise exposure one would experience if listening to a particular sound source, such as a music concert, for one hour.

For any noise exposure over a given interval of time, ANSI S1.25-1991 defines the "equivalent continuous sound level", denoted as Leq. If, for example, the Leq for the actual QUICK-CHECK measurement interval is the same as that which would exist were the sound measured over a full hour, then a preferred embodiment of the invention running the QUICK-CHECK mode may precisely predict the 1 hour noise exposure after performing a 112.5 second measurement Referring again to FIG. 4C, at step 455 the dosimeter 105 determines whether the operational mode is NORMAL or QUICK-CHECK. If NORMAL mode is being run, the dosimeter saves run information to non-volatile memory at step 459 and then shuts down at step 470. However, if QUICK-CHECK mode is being run, at step 457 the final predictive dose is calculated and displayed for a predetermined length of time, which may be referred to as the hold time, for example, 8 seconds. This hold time of 8 seconds is especially useful when adaptive termination is employed by the user because the display immediately prior to early user termination of a QUICK-CHECK run (adaptive termination) may differ from the final predictive result as explained below. Following the display of the final predictive dose in QUICK-CHECK mode, the dosimeter saves run information to non-volatile memory, as it does in NORMAL mode, at step 459, and then shuts down at step 470.

If a dosimeter according to the present invention is terminated early in QUICK-CHECK mode, referred to herein as adaptive termination, the final predictive dose is computed based on the actual QUICK-CHECK measurement interval rather than the nominal measurement interval. Thus early termination in QUICK-CHECK results in what may be referred to as adaptive predictive dose calculation at step 457.

In a preferred embodiment of the invention, appropriate to noise exposure, the calculation at step 457 takes place according to Eqn. 1:

$$\text{Final\_Predictive\_Dose} = \text{Accumulated\_Dose} * \frac{\text{nominal\_QCHK\_measurement\_interval}}{\text{actual\_QCHK\_measurement\_interval}} \quad \text{Eqn. 1}$$

Note that in Eqn. 1 above, the value of Accumulated_Dose, which is computed at step 411 of FIG. 4A, is calculated such that, while a QUICK-CHECK measurement is ongoing, the accumulated dose represents a predictive dose assuming that the run completes without adaptive termination. Thus, for example, when the nominal QUICK-CHECK measurement interval is 1/32 of an hour or 112.5 seconds and the dosimeter prediction interval is 1 hour, the accumulated dose is computed to be 32 times greater than the real-time dose, as explained above in reference to steps 409 and 411. Note also that in QUICK-CHECK mode calculations illustrated in FIG. 4 and FIG. 5, a linear relationship between measurement interval and dose for stationary signals is assumed; however, if such a linear relationship is not valid for a particular form of dosimetry calculations, the calculations may be modified accordingly.

Again in reference to Eqn. 1, if for example, the accumulated dose at step 457 is 55%, the nominal QUICK-CHECK measurement interval is 112.5 seconds and the actual QUICK-CHECK measurement interval is 30 seconds due to adaptive termination of the run, then the final predictive dose would be 206.25%. If this were noise dosimetry and the Leq of the sound as measured during the 30 second adaptive predictive QUICK-CHECK measurement were equal to or near the Leq of the sound that the user would have been exposed to for the entire dosimeter prediction interval, for example 1 hour, then the final predictive dose is very accurate when compared to a NORMAL measurement of the same sound source over that a 1-hour interval.

Eqn. 1 applies to noise dosimetry and may apply to other forms of dosimetry as well. However, this calculation may be modified if appropriate for applications other than standard noise dosimetry.

Some run information that may be written to the non-volatile memory at step 459 includes the mode (NORMAL or QUICK-CHECK); the final dose; identifying information for the run itself, such as run number; the nominal measurement interval and the actual measurement interval; the dosimeter prediction interval for QUICK-CHECK runs; measurement parameters, which may include, in the case of noise dosimetry, the exchange rate, the criterion level, the threshold level; calibration information; and any error or warning information. The final dose may or may not be equal to the last accumulated dose data value saved during step 453.

Figure 5A:
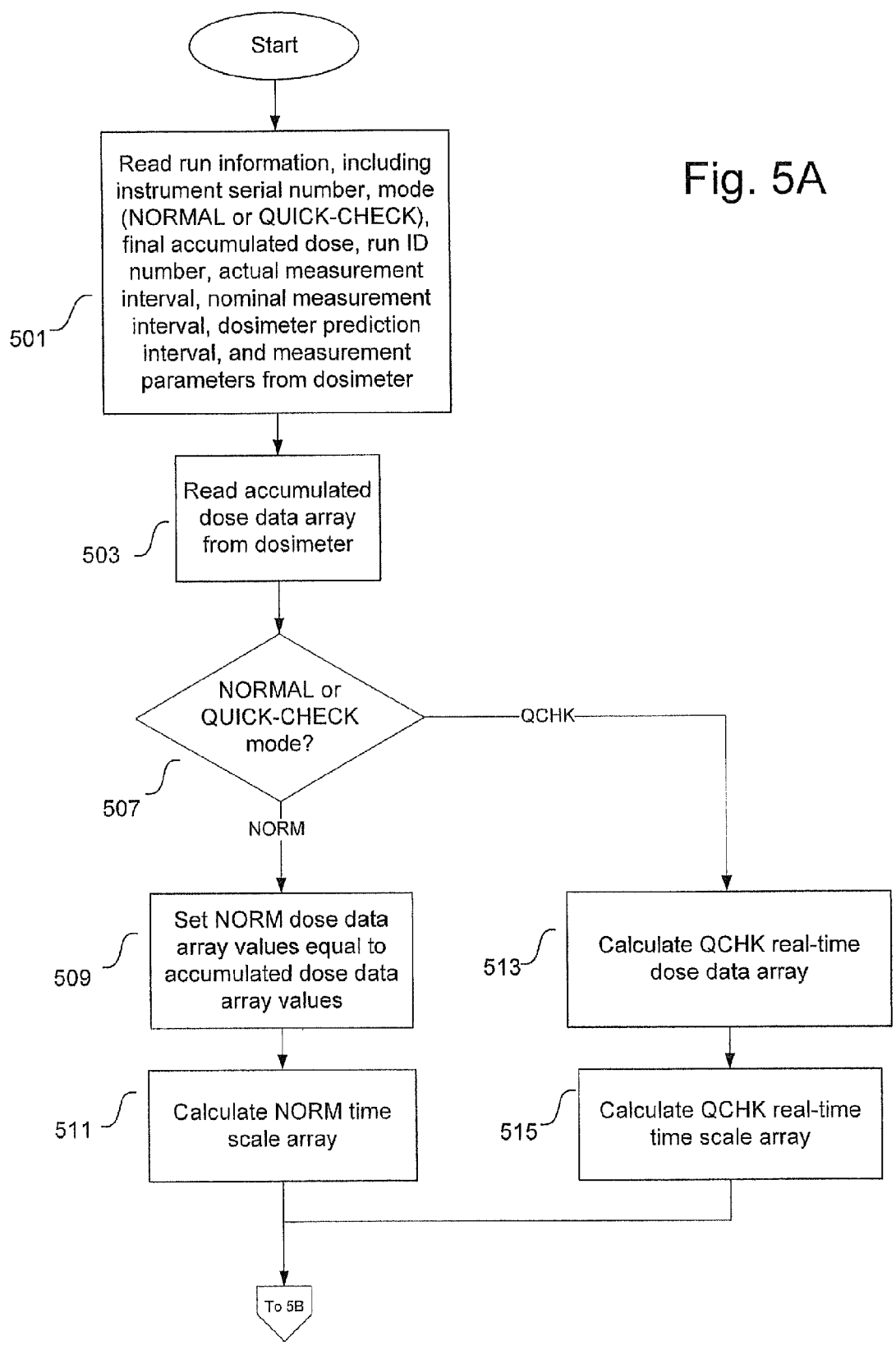
FIG. 5A illustrates a flow chart of a first part of an exemplary method for analyzing data received from a dosimeter in NORMAL or QUICK-CHECK mode, in accordance with an embodiment of the present invention.
Figure 5C:
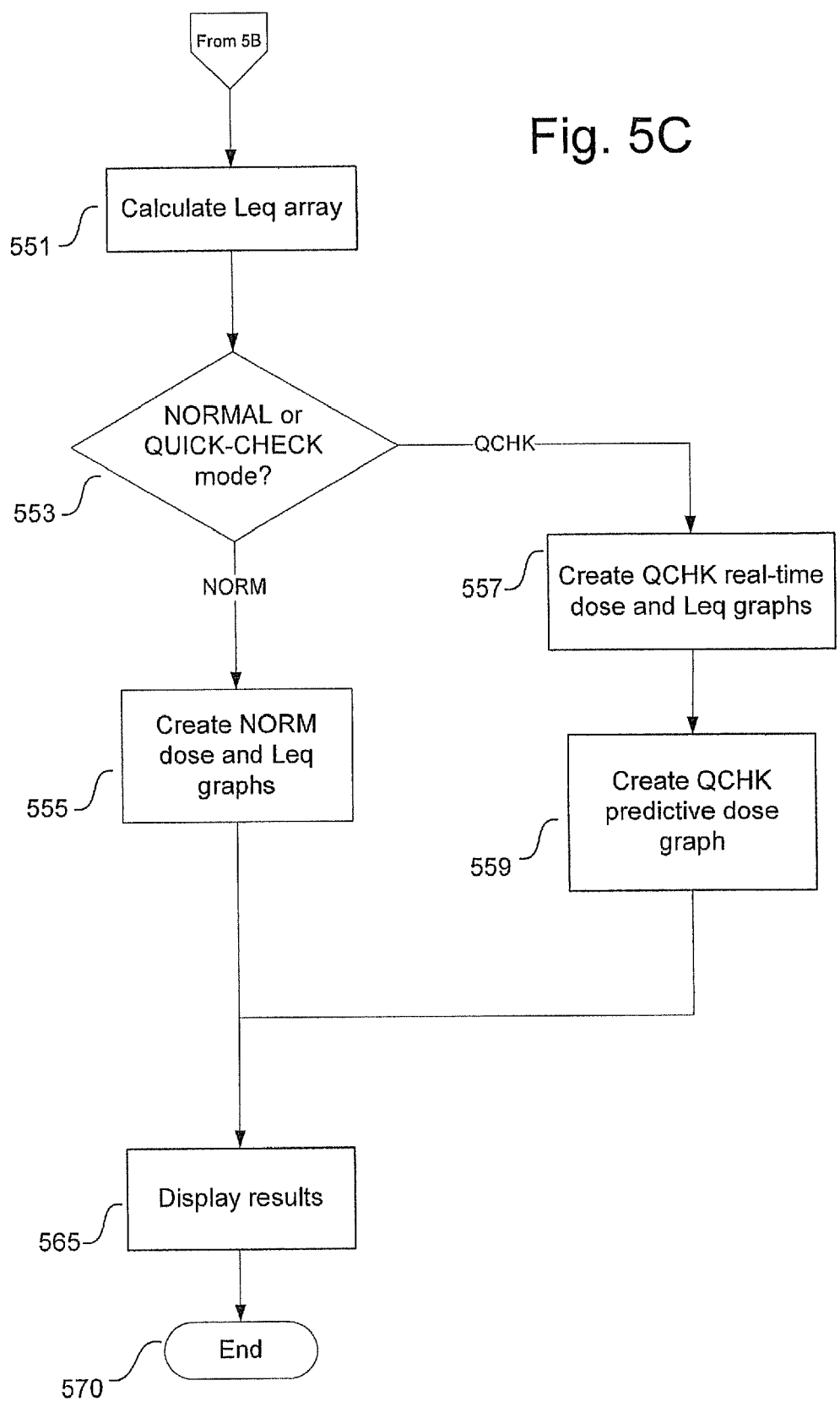
FIG. 5C illustrates a flow chart of a third part of an exemplary method for analyzing data received from a dosimeter in NORMAL or QUICK-CHECK mode, in accordance with an embodiment of the present invention.

FIGS. 5A, 5B and 5C illustrate in three parts a flow chart of an exemplary method for analyzing the data from a dosimeter, in accordance with an embodiment of the invention. Assume that a computer 130 is connected to dosimeter 105 as shown in FIG. 1. Upon recognition that a dosimeter 105 is attached, the computer 130 may either automatically read information from the dosimeter 105 or provide the user of the computer the option of reading information from the dosimeter 105. Although a dosimeter 105 may have data from more than one run in its non-volatile memory, for the purposes of illustrating the features of the invention, in the flowchart of FIGS. 5A, 5B, and 5C it is assumed that information regarding one run, either a NORMAL run or a QUICK-CHECK run, is read from the dosimeter 105.

Referring now to FIG. 5A, at steps 501 and 503 the information regarding a single dosimeter run is read. In the steps that follow, that run information is subsequently analyzed.

Run information that may have been written to the non-volatile memory (refer to step 459 of FIG. 4C) includes the instrument serial number, the mode; the final dose; identifying information for the run; nominal, actual and predictive measurement intervals; measurement parameters; calibration information; and error or warning information. This information is read from the dosimeter at step 501.

At a next step 503, the accumulated dose data array for the run is read by the computer. In a preferred embodiment, dose data is formatted as a collection or array of samples of accumulated dose as measured at specific intervals of time. For example, in NORMAL mode, each sample of accumulated dose may be a 3-byte floating point representation and the time interval between samples is 3.75 minutes. Thus, in the above example, there are 16 samples of dose data per hour; and for a complete 16 hour NORMAL run, there is 256 samples or 768 bytes of data total.

For a QUICK-CHECK run, the time interval between samples may be much shorter because the run itself, for example, may be only 112.5 seconds long. In a preferred embodiment, a complete 112.5 second QUICK-CHECK run consists of 64 samples of dose data, each of which is represented by a 3-byte floating point number, with a time interval of ½₀₄₈ hour between samples (one sample approximately every 1.75 seconds), or 192 bytes of data total.

The first sample of the accumulated dose data array read at step 503 is designated as Accumulated_Dose[1]. The last sample of the accumulated dose data array read at step 503 is designated as Accumulated_Dose[N]. In some cases, depending on when and if a NORMAL or QUICK-CHECK measurement is terminated early, an additional data point (index n=N+1) may be appended to the measurement arrays. Thus, Accumulated_Dose[N] may not be the final accumulated dose. This is described below in reference to steps 525, 527, 529 and 531 of FIG. 5B (see Eqns. 6-9)

At a next step 507, a decision block determines whether the run was a NORMAL mode run or a QUICK-CHECK mode run. The dose data array read at step 503 is evaluated differently depending on whether the mode was NORMAL or QUICK-CHECK. NORMAL calculations take place at steps 509 and 511. QUICK-CHECK calculations take place at steps 513 and 515.

In the case of a NORMAL mode run, at step 509, NORMAL mode dose data array values are set to equal the accumulated dose data array that had been previously read at step 503. The first NORMAL mode dose data array value, NORM_Dose[0], is set equal to 0 to indicate that the accumulated dose at the very beginning of the measurement is 0.

$$\text{NORM\_Dose}[0]=0; \text{NORM\_Dose}[n]=\text{Accumulated\_Dose}[n], n=1\ldots N \quad \text{Eqn. 2:}$$

In a preferred embodiment of the invention, dose data array values in NORMAL mode are normalized such that 1.0 (100%) represents the maximum safe dose for an 8-hour measurement interval.

At a next step 511, the NORMAL time scale array is calculated. A predetermined value for the NORMAL mode sampling interval, for example, 3.75 minutes, may be used. Thus, the NORMAL time scale array is simply calculated at step 511 as shown in Eqn. 3 below.

$$\text{NORM\_Time}[n]=n*\text{NORM\_sampling\_interval}; n=0\ldots N \quad \text{Eqn. 3:}$$

The calculations associated with a QUICK-CHECK run are considerably more involved because of the predictive nature of QUICK-CHECK in the present invention. Steps 513 and 515 are executed if the run is a QUICK-CHECK run as detailed below.

For QUICK-CHECK runs, the real-time dose data array is calculated at step 513, and the time scale array is calculated at step 515. In a preferred embodiment, as discussed above with reference to steps 409 and 411 of FIG. 4A, the calculation of incremental dose in QUICK-CHECK mode differs from the calculation of incremental dose in NORMAL mode. This is because the display indicates ongoing predicted dose assuming that the run is not terminated early and the ongoing calculations are adjusted accordingly. Thus, as mentioned above, the accumulated dose calculated at step 411 during QUICK-CHECK runs may be greater than the accumulated dose calculated at step 411 during NORMAL runs by a factor equal to the ratio of the dosimeter prediction interval to the nominal QUICK-CHECK measurement interval.

QUICK-CHECK accumulated dose data samples are saved to non-volatile memory assuming that the run will not be terminated early. In an embodiment of the invention, the accumulated dose data is multiplied by 32 prior to being displayed and saved to non-volatile memory, because 32 is the ratio of dosimeter prediction interval, 1 hour, to nominal QUICK-CHECK measurement interval, 112.5 seconds. Eqn. 4 below clarifies the calculation of the QUICK-CHECK real-time dose data array, which occurs at step 513, in a preferred embodiment.

$$\text{Real-time\_Dose}[n] = \text{Accumulated\_Dose}[n] * \frac{\text{nominal\_QCHK\_measurement\_interval}}{\text{dosimeter\_prediction\_interval}}, \qquad \text{Eqn. 4}$$

$$n = 1 \ldots N;$$

$$\text{Real-time\_Dose}[0] = 0.$$

At a next step 515, the QUICK-CHECK real-time time scale array is calculated. A predetermined value for the QUICK-CHECK mode sampling interval, for example, $\frac{1}{2048}$ hour (approximately 1.75 seconds), may be used. Thus, the QUICK-CHECK time scale array is simply calculated at step 515 as shown below in Eqn. 5:

$$\text{Real-time\_Time}[n] = n * \text{QCHK\_sampling\_interval}; \\ n = 0 \ldots N \qquad \text{Eqn. 5:}$$

Following the calculation of either the NORMAL time scale array at step 511 or the QUICK-CHECK time scale array at step 515, the computer 130 next executes step 521 as shown in FIG. 5B. At step 521 the final point of the time scale array (which had been previously computed at either step 511 for NORMAL mode or step 515 for QUICK-CHECK mode) is compared to the actual measurement interval, which had been read from the dosimeter at step 501. In the present invention, a measurement may be terminated early by the user, which, in a preferred embodiment occurs when the user presses and holds pushbutton 115. In the embodiment illustrated in FIG. 4, the state of the pushbutton may be detected during every interrupt (see step 443 of FIG. 4B). Thus the end of a measurement may not occur during the same interrupt in which the saving of an accumulated dose sample occurs (step 423), and, as a result, the final point of the time scale array calculated at either step 511 or step 515 may not equal the actual measurement interval. Rather than discard a last data point, the system of the present invention appends the last data point to the measurement data. Both the actual measurement interval and the final accumulated dose had been downloaded from the dosimeter at step 501, as described above.

If it is the case that the final time scale array value does not equal the actual measurement interval, execution continues at a next step 523 where a decision is made as to whether the measurement is NORMAL or QUICK-CHECK mode. If it is the case that the final time scale array value does, in fact, equal the actual measurement interval, execution continues at step 535 and none of the steps 525, 527, 529 and 531 are executed.

For NORMAL mode measurements, in the case where the final time scale array value is not equal to the actual measurement interval, execution continues at step 525 where the actual measurement interval is appended to the NORMAL time scale array as shown below in Eqn. 6. Note that, if step 525 is executed, the last point of the NORMAL time scale array is not an integer multiple of the NORMAL mode sampling interval.

$$\text{NORM\_Time}[N+1] = \text{Actual\_Measurement\_Interval} \qquad \text{Eqn. 6:}$$

At a next step 527, executed for NORMAL mode measurements if the final point of the NORMAL time scale array is not equal to the actual measurement interval, the final accumulated dose data point is appended to the NORM dose data array as shown below in Eqn. 7.

$$\text{NORM\_Dose}[N+1] = \text{Final\_Accumulated\_Dose} \qquad \text{Eqn. 7:}$$

For QUICK-CHECK measurements, in the case where the final time scale array vale is not equal to the actual measurement interval, execution continues from decision block 523 to step 529, where the actual measurement interval is appended to the QUICK-CHECK real-time time scale array as shown below in Eqn. 8. Note that, if step 529 is executed, the last point of the QUICK-CHECK real-time time scale array is not an integer multiple of the QUICK-CHECK mode sampling interval.

$$\text{Real-time\_Time}[N+1] = \text{Actual\_Measurement\_Interval} \qquad \text{Eqn. 8:}$$

At a next step 531, executed for QUICK-CHECK mode measurements if the final point of the QUICK-CHECK real-time time scale array is not equal to the actual measurement interval, execution continues at step 531, where the final QUICK-CHECK real-time dose may be calculated prior to it being appended to the real-time dose data array. The calculation of the final QUICK-CHECK real-time dose value (Eqn. 9 below) is similar to the calculation of the rest of the real-time dose array described above with reference to step 513 and Eqn. 4.

$$\text{Real-time\_Dose}[N+1] = \text{Final\_Accumulated\_Dose} * \frac{\text{nominal\_QCHK\_measurement\_interval}}{\text{dosimeter\_prediction\_interval}} \qquad \text{Eqn. 9}$$

For NORMAL mode measurements, in the case where the final time scale array interval is not equal to the actual measurement interval, following the appending of the last data point to both the NORMAL time array and NORMAL dose data array, execution continues at step 535. Similarly, for QUICK-CHECK mode measurements, in the case where the final time scale array value is not equal to the actual measurement interval, following the appending of the last data point to both the real-time time array and real-time dose data array, execution continues at step 535. Step 535 is another decision block. For NORMAL mode measurements, execution continues at step 551 of FIG. 5C, whereas for QUICK-CHECK mode measurements, both the predictive dose data array and the predictive time-scale array are calculated at steps 537 and 539 respectively.

At the time step 535 is executed, two arrays have thus far been generated, each with either N or N+1 entries, depending on whether the final point of the time scale array at step 521 is equal to the actual measurement interval. The NORMAL mode arrays are designated as NORM_Time[n] and NORM_Dose[n]; and the QUICK-CHECK mode arrays are designated as Real-time_Time[n] and Real-time_Dose[n]. An advantage of the present invention is the predictive measurement capability afforded the user of QUICK-CHECK mode. Thus, for QUICK-CHECK runs, two more arrays are generated, designated as Predictive_Time[n] and Predictive_Dose[n].

In order to calculate the Predictive_Time[n] and Predictive_Dose[n] arrays, both the analysis prediction interval, which in a preferred embodiment is user-settable at the time the dosimeter data is downloaded and evaluated, and the actual measurement interval is considered.

During a QUICK-CHECK run, as described in reference to FIG. 4 above, at step 409, the dosimeter predictive interval is considered in the calculation of incremental dose. The user of a dosimeter according to the present invention may be aware of the dosimeter predictive interval in order to interpret the ongoing displayed accumulated dose during a QUICK-CHECK measurement (step 413) as well as the final predicted dose displayed immediately after a QUICK-CHECK measurement is complete (step 457). However, in a preferred embodiment, as mentioned above, the analysis prediction interval is user-settable at the time the dosimeter's data is downloaded and evaluated and thus may not be equal to the dosimeter prediction interval. The analysis of QUICK-CHECK measurement data with the added capability of adjusting the prediction interval provides the invention with increased utility.

At step 537, the QUICK-CHECK predictive time scale array is calculated as shown in Eqn. 10 below and following this, at a next step 539, the QUICK-CHECK predictive dose data array is calculated as shown in Eqn. 11 below. Simply stated, in a preferred embodiment of the invention, the calculations at steps 537 and 539 scale both the real-time time array and real-time dose array values for QUICK-CHECK runs by the ratio of the analysis prediction interval to the actual measurement interval.

$$\text{Predictive\_Time}[n] = \text{Real-time\_Time}[n] * \frac{\text{analysis\_prediction\_interval}}{\text{actual\_measurement\_interval}} \quad \text{Eqn. 10}$$

$$\text{Predictive\_Dose}[n] = \text{Real-time\_Dose}[n] * \frac{\text{analysis\_prediction\_interval}}{\text{actual\_measurement\_interval}} \quad \text{Eqn. 11}$$

Execution then continues at a next step 551 illustrated in FIG. 5C. At this step, an Leq array is calculated. Leq, or equivalent level, is defined for noise dose measurements in ANSI specification S1.25-1991. In embodiments with applicability to dose measurements other than noise dose, the equivalent level calculation at step 551 may be omitted or an alternative calculation appropriate to the application may be substituted. In a preferred embodiment, for NORMAL mode measurements, the Leq array is calculated such that Leq[n] is the sound pressure level in decibels, which if continually present during the interval between NORM_Time[n−1] and NORM_Time[n], results in the change of accumulated dose (NORM_Dose[n]−NORM_Dose[n−1]). Similarly, for QUICK-CHECK mode measurements, the Leq array is calculated such that Leq[n] is the sound pressure level in decibels, which if continually present during the interval between Real-time_Time[n−1] and Real-time_Time[n], results in the change of accumulated dose (Real-time_Dose[n]−Real-time_Dose[n−1]). Leq[0] is thus undefined.

At a next step 553, a decision block determines whether the measurement mode is NORMAL or QUICK-CHECK. For NORMAL mode runs, subsequent step 555 creates the graphical representation of the NORMAL measurement data, while for QUICK-CHECK mode runs, subsequent steps 557 and 559 create the graphical representations of the QUICK-CHECK real-time measurement data and QUICK-CHECK predictive measurement data, respectively. In a preferred embodiment, the Leq data is graphed for real-time measurement data and not for predictive measurement data.

At step 565, whether it is a NORMAL or QUICK-CHECK run, graphical results are displayed for the measurement. The method then ends at step 570. It will be understood by those having ordinary skill in the art that FIG. 5 illustrates a method designed in accordance with the present invention and other functionality and capabilities may be present.

Figure 6:
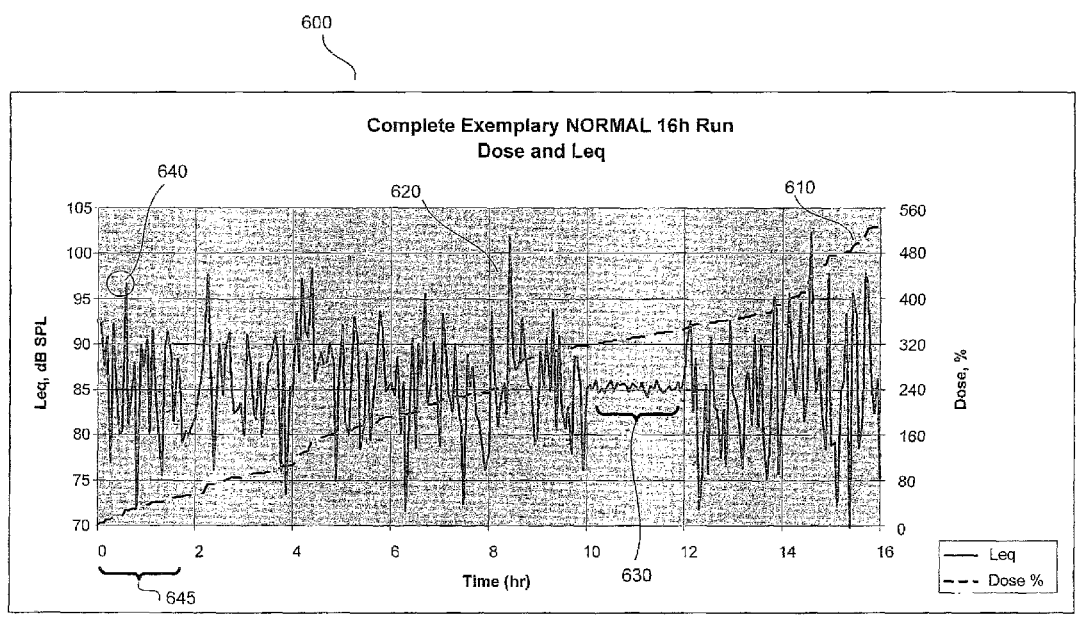
FIG. 6 illustrates exemplary NORMAL mode data as displayed by a computer in accordance with an embodiment of the present invention, wherein the NORMAL run of 16 hours was not terminated early.
Figure 7:
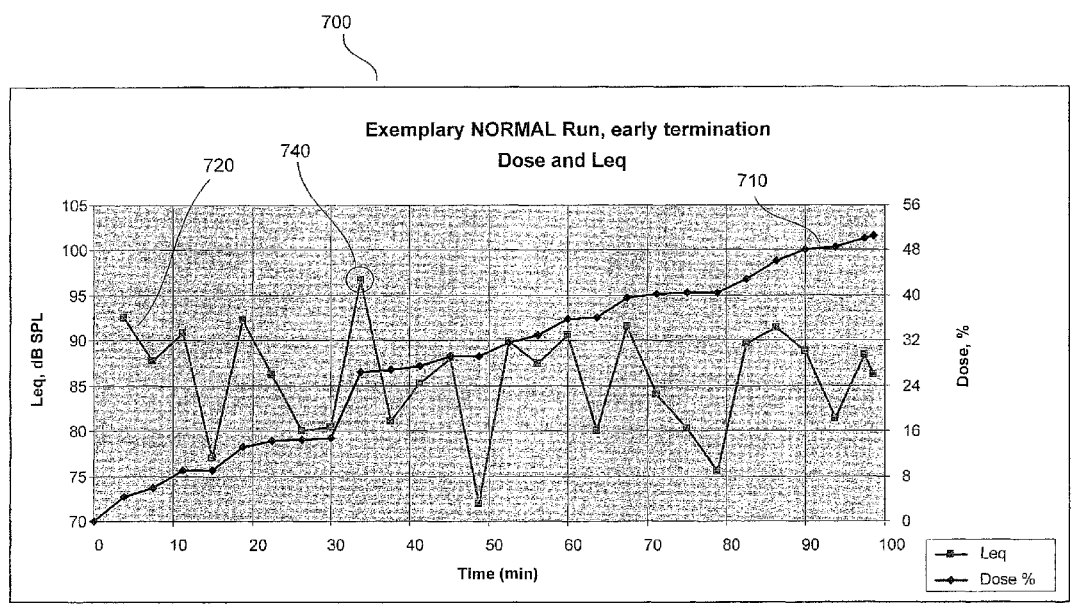
FIG. 7 illustrates exemplary NORMAL mode data as displayed by a computer in accordance with an embodiment of the present invention, wherein the NORMAL run was terminated early.

FIG. 6 through FIG. 10 illustrate exemplary dosimeter measurement data in graphical form as may be generated by a system of noise dosimetry according to an embodiment of the invention. In FIG. 6, data from a completed 16-hour NORMAL measurement is shown. FIG. 7 shows NORMAL measurement data for a run which was terminated early.

Figure 8A:
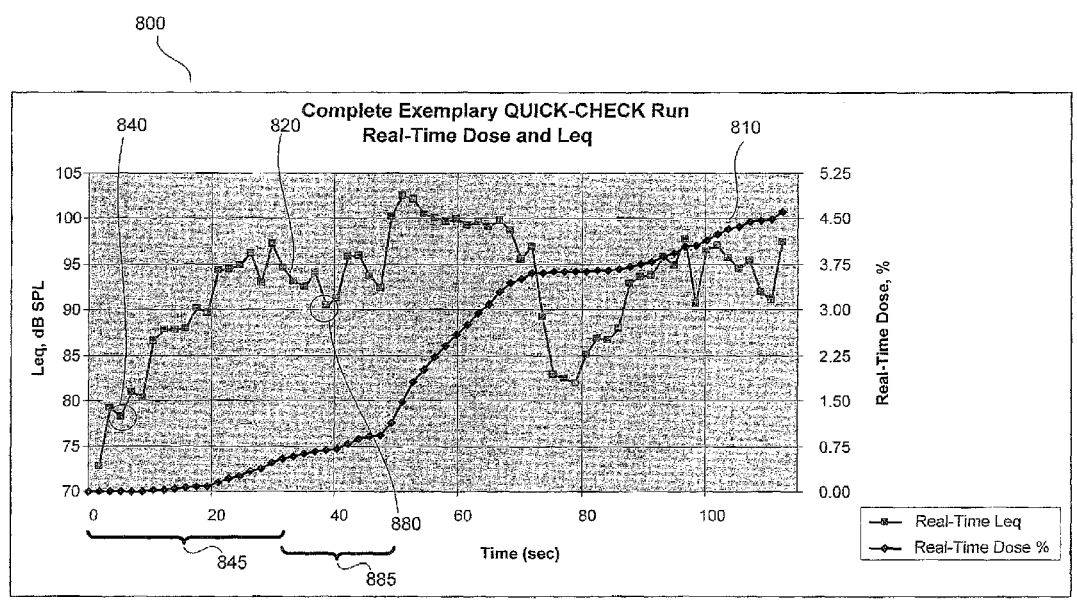
FIG. 8A illustrates exemplary QUICK-CHECK mode real-time dose and Leq data as displayed by a computer in accordance with an embodiment of the present invention, wherein the QUICK-CHECK run was not terminated early.

FIGS. 8A, 8B, and 8C show QUICK-CHECK measurement data wherein no adaptive termination took place. Finally, FIGS. 9A, 9B, 10A, and 10B show data from two different examples of QUICK-CHECK runs with adaptive termination.

With reference to FIG. 6, graph 600 comprises both NORMAL dose data 610 in units of % and Leq data 620 in units of decibels sound pressure level. The dose increases monotonically throughout the measurement, with a final dose of approximately 525%. During the time interval 630 between about 10 hours and 12 hours, the sound pressure level is relatively constant at around 85 dB and the dose increases linearly during that interval. For noise dosimetry, a constant sound pressure level results in a perfectly linear increase of dose over time. Reference is made to data point 640, which is a local Leq maximum occurring at around 33 minutes into the measurement, and bracketed region 645 during the description of FIG. 7 below.

To illustrate the effect of early termination of a NORMAL measurement, the input signal used to create FIG. 7 is a portion of that used to create FIG. 6. Graph 700 comprises both NORMAL dose data 710 and Leq data 720. The run illustrated in FIG. 7 was terminated at around 99 minutes with a final dose value of approximately 50%. Data points are evenly spaced 3.75 minutes apart, with the exception of the final data point. This is because, as discussed above with reference to FIG. 5B step 521, termination of the run took place at a time that did not coincide with the saving of an accumulated dose. Data point 740 of FIG. 7 corresponds to data point 640 of FIG. 6.

FIGS. 8A, 8B, and 8C illustrate exemplary QUICK-CHECK mode measurement, wherein the QUICK-CHECK run was not terminated early. The QUICK-CHECK nominal measurement interval is ⅓₂ hour or 112.5 seconds. FIG. 8A shows the real-time measurement data for the completed 112.5 second QUICK-CHECK run. Graph 800 comprises both real-time dose data 810 in units of % and Leq data 820 in units of decibels sound pressure level. 65 data points are shown, evenly spaced from time=0 to time=112.5 seconds, with a final real-time dose of approximately 4.6%. The input signal used to generate FIGS. 8A, 8B and 8C was a popular song with a quiet introduction. The song becomes progressively louder for about the first 50 seconds.

Reference is made to data point 840, which is a local Leq minimum occurring at around 5.3 seconds into the measurement, and bracketed region 845 during the description of FIG. 9 below. Reference is also made to data point 880, which is a local Leq minimum occurring at around 38.7 seconds into the measurement, and bracketed region 885 during the description of FIG. 10 below.

FIGS. 8B and 8C illustrate predictive measurement results consistent with the real-time measurement of FIG. 8A. Graph 890 of FIG. 8B is a predictive dose graph corresponding to the real-time dose graph 810 of FIG. 8A. The prediction interval for FIG. 8B is 1 hour and the QUICK-CHECK nominal measurement interval is ⅓₂ of an hour; thus, the final predictive dose in FIG. 8B is 32 times that of FIG. 8A, approximately 150%. Similarly, graph 895 of FIG. 8C is a predictive dose graph which also corresponds to the real-time dose graph 810 of FIG. 8A. The prediction interval of FIG. 8C is 4 hours, so the final predictive dose in FIG. 8C is 128 times that of FIG. 8A, approximately 600%. The predictive dose plots of FIGS. 8B and 8C are scaled versions of the real-time dose plot of FIG. 8A.

Figure 9A:
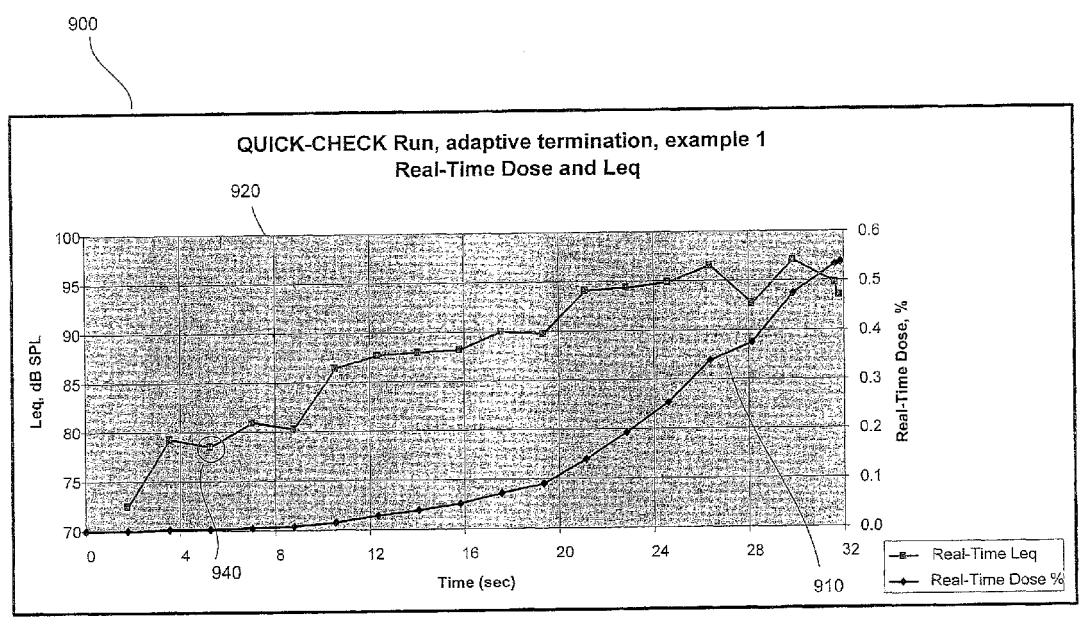
FIG. 9A illustrates a first example of QUICK-CHECK mode real-time dose and Leq data as displayed by a computer in accordance with an embodiment of the present invention, wherein the QUICK-CHECK run was adaptively terminated.
Figure 9B:
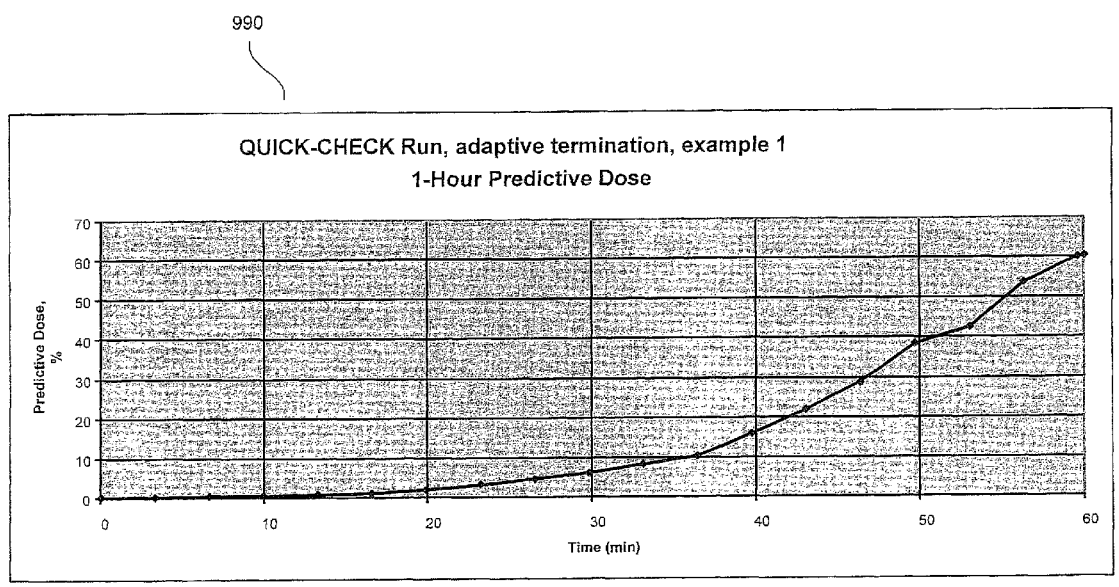
FIG. 9B illustrates a first example of QUICK-CHECK mode 1-hour predictive dose data as displayed by a computer in accordance with an embodiment of the present invention, wherein the QUICK-CHECK run was adaptively terminated.
Figure 10A:
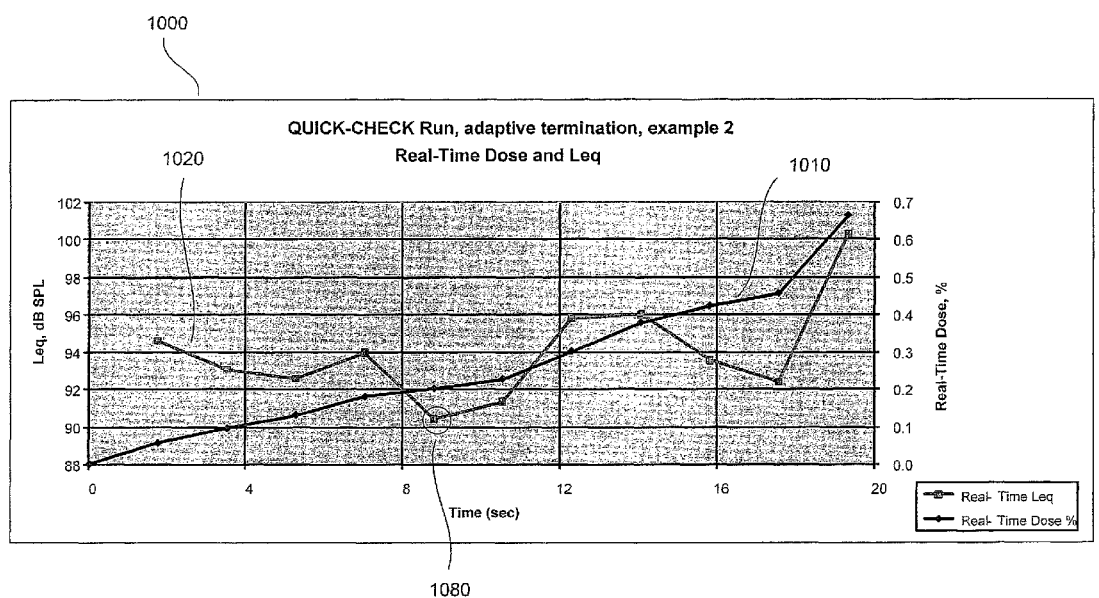
FIG. 10A illustrates a second example of QUICK-CHECK mode real-time dose and Leq data as displayed by a computer in accordance with an embodiment of the present invention, wherein the QUICK-CHECK run was adaptively terminated.
Figure 10B:
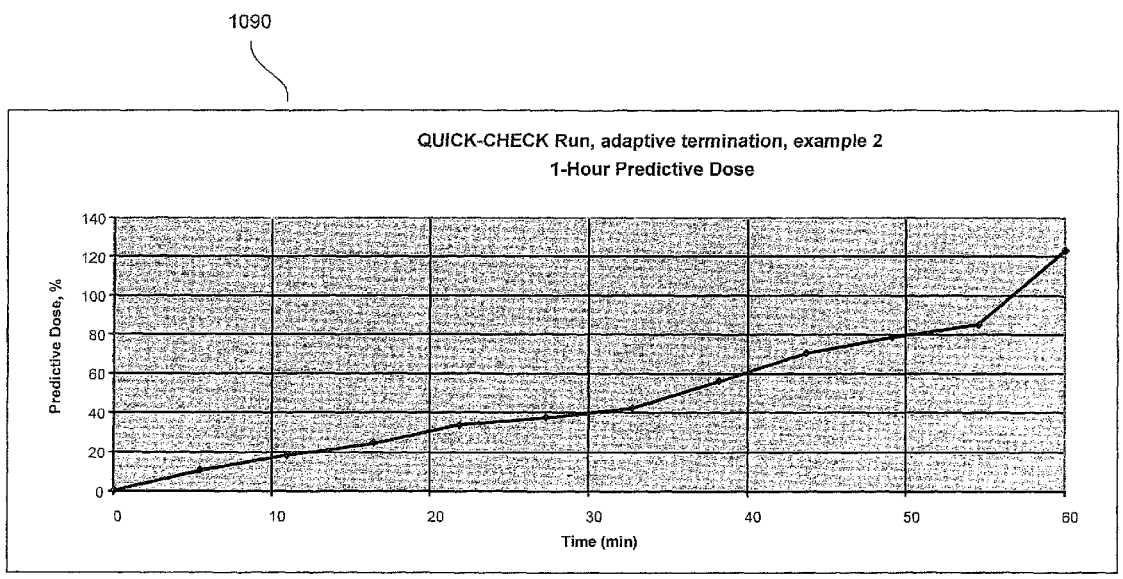
FIG. 10B illustrates a second example of QUICK-CHECK mode 1-hour predictive dose data as displayed by a computer in accordance with an embodiment of the present invention, wherein the QUICK-CHECK run was adaptively terminated.

To illustrate the effect and utility of adaptive (early) termination of a QUICK-CHECK measurement, the input signal used to create FIGS. 9A and 9B is a first portion of the input signal used to create FIG. 8A and is shown as bracketed region 845. Note that this is during the relatively quiet introduction of a popular song. To further illustrate the utility of adaptive termination, the input signal used to create FIGS. 10A and 10B is a second portion of the input signal used to create FIG. 8A and is shown as bracketed region 885. FIGS. 9A and 9B illustrate a first example of adaptive termination of a QUICK-CHECK run and FIGS. 10A and 10B illustrate a second example of an adaptive termination of a QUICK-CHECK run.

With reference to FIG. 9A, graph 900 comprises both QUICK-CHECK real-time dose data 910 and Leq data 920. The run illustrated in FIG. 9A was terminated at around 32 seconds into the run with a final real-time dose value of approximately 0.53% and, as mentioned above, was created using a first portion 845 of the input signal of FIG. 8A. 19 evenly-spaced dose data points, plus a final data point, are shown in FIG. 9A, and because this is real-time data, the spacing of the first 19 dose data points is identical to the spacing of the first 19 dose data points shown in FIG. 8A, approximately 1.75 seconds. Leq data point 940 of FIG. 9A corresponds to Leq data point 840 of FIG. 8A and it is apparent that the first 18 Leq data points illustrated in FIG. 9A are identical to the first 18 Leq data points illustrated in FIG. 8A.

FIG. 9B illustrates predictive measurement results consistent with the real-time measurement of FIG. 9A. Graph 990 of FIG. 9B is a predictive dose graph corresponding to the real-time dose graph 910 of FIG. 9A. The prediction interval for FIG. 9B is 1 hour (3600 seconds) and the QUICK-CHECK actual measurement interval is approximately 32 seconds; thus, the final predictive dose in FIG. 9B is approximately 3600/32 times that of FIG. 9A, about 60%. Note that FIG. 9B illustrates an adaptive predictive QUICK-CHECK run with a prediction interval of 1 hour and that the input signal of FIG. 9B is a first portion 845 of the input signal which generated the predictive QUICK-CHECK run of FIG. 8B, also with a prediction interval of 1 hour. If the input signals were stationary throughout the runs, the resulting final dose shown in FIG. 9B would be identical to that shown in FIG. 8B; however this is not the case. The final predictive dose in FIG. 8B is approximately 150% whereas the final predictive dose in FIG. 9B is significantly less at approximately 60%. This is because the portion of the input signal used to generate FIG. 9B is during the relatively quiet introduction of a popular song and is thus not reflective of the overall level of the signal used for FIG. 8B.

With reference to FIG. 10A, graph 1000 comprises both QUICK-CHECK real-time dose data 1010 and Leq data 1020. The run illustrated in FIG. 10A was created using a second portion 885 of the input signal of FIG. 8A. The portion used begins approximately 32 seconds into the musical input signal of FIG. 8A and ends approximately 19 seconds later. The final real-time dose in FIG. 10A is approximately 0.67%. The spacing of the real-time data points of FIG. 10A is approximately 1.75 seconds, consistent with real-time data spacing of both FIGS. 8A and 9A. Leq data point 1080 of FIG. 10A corresponds to Leq data point 880 of FIG. 8A and it is apparent that the first Leq data points illustrated in FIG. 10A are identical to the Leq data points illustrated in FIG. 8A and contained in bracketed region 885.

FIG. 10B illustrates predictive measurement results consistent with the real-time measurement of FIG. 10A. Graph 1090 of FIG. 10B is a predictive dose graph corresponding to the real-time dose graph 1010 of FIG. 9A. The prediction interval for FIG. 10B is 1 hour (3600 seconds) and the QUICK-CHECK actual measurement interval is approximately 19 seconds; thus, the final predictive dose in FIG. 10B is 3600/19 times that of FIG. 10A, around 125%. As in the case of FIG. 9B, FIG. 10B illustrates an adaptive predictive QUICK-CHECK run with a prediction interval of 1 hour utilizing an input signal which is a second portion 885 of the input signal which generated the predictive QUICK-CHECK run of FIG. 8B, also with a prediction interval of 1 hour. In this case, although the input signals are not stationary throughout the runs, the resulting final dose shown in FIG. 10B close to that shown in FIG. 8B. The final predictive dose in FIG. 8B is approximately 150% whereas the final predictive dose in FIG. 10B is approximately 125%. This is because the portion of the input signal used to generate FIG. 10B is reasonably reflective of the overall level of the signal used for FIG. 8B.

One aspect of the present invention is a dosimeter system and method having the capability to rapidly measure hazardous exposure for a user-controllable amount of time and thereby predict dose over a user-settable dosimeter prediction interval in situations where the wearer may be exposed to any measurable hazard that is of a substantially similar nature for an extended period.

As will be understood by those having ordinary skill in the art, embodiments of the present invention may be applied to various types of dose measurement, such as noise dose measurement, radiation dose measurement, or chemical vapor dose measurement.

In one exemplary embodiment of the invention, a methodology may involve performing as much of the signal processing digitally as possible, thereby minimizing the complexity of the analog components of the dosimeter. In another exemplary embodiment of the invention, the analog and digital processing may be segmented. RMS level detection and frequency weighting may be provided in analog circuitry, and the remaining processing may be performed digitally.

Numerous new digital processing components are available and affordable, and may be fit for use with a dosimeter according to the present invention. One example of these devices may be the dsPIC ("digital signal controller") devices manufactured by Microchip Technology. The dsPIC part includes an analog to digital converter, and also incorporates specially designed digital signal processing capability. The PIC18LF4550, used in a preferred embodiment and discussed above with respect to FIG. 2 is a less expensive and less capable component, which includes an analog to digital converter, but is not designed for high throughput digital signal processing applications.

A highly digital approach may be implemented using a dsPIC or a similar component. The dsPIC is capable of digitally processing audio. An external ADC may be used in conjunction with the dsPIC to improve the resolution of the analog to digital conversion.

In an embodiment of the present invention Microchip Technologies PIC18LF4550 microcontroller and the Linear Technology LTC1966 RMS Detector may be utilized. Circuitry may be utilized to improve the performance of the LTC1966 at low levels to have an extended dynamic range as described in copending application Ser. No. 11/643,328. In an embodiment of the present invention, the noise dosimeter system may go through an automatic routine when started up, to extend the dynamic range of the RMS detector. In one embodiment of the invention the automatic routine at startup determines input and/or output offset voltages at the RMS detector or elsewhere in the circuit and stores correction factors to minimize the measurement errors caused by those offset voltages. During this routine, the processor turns off or disconnects the microphone, thus preventing any audio signal from affecting the RMS detector.

In an embodiment of the present invention, alternative non-standard approaches to dose measurement may be employed. New standards for dose measurement are introduced from time to time by various researchers and by various standards organizations worldwide.

One embodiment of the present invention is a dosimeter system and method having the capability to rapidly measure hazardous exposure for a user-controllable amount of time and thereby predict dose over a user-settable dosimeter prediction interval in situations where the wearer may be exposed to any measurable hazard that is of a substantially similar nature for an extended period.

Another embodiment of the present invention is a dosimeter system and method having the capability to receive an electrical signal representative of the hazard to which the user is exposed and also having the capability to rapidly measure hazardous exposure for a user-controllable amount of time and thereby predict dose over a user-settable dosimeter prediction interval in situations where the wearer may be exposed to any measurable hazard that is of a substantially similar nature for an extended period.

Another embodiment of the present invention is a noise dosimeter system and method having the capability to rapidly measure sound level for a user-controllable amount of time and thereby predict noise dose over a user-settable dosimeter prediction interval in situations where the wearer may be exposed to sound that is of a substantially similar nature for an extended period.

Another embodiment of the present invention is a noise dosimeter system and method having the capability to receive an electrical signal representative of the sound which would be presented to a user and also having the capability to rapidly measure sound level for a user-controllable amount of time and thereby predict noise dose over a user-settable dosimeter prediction interval in situations where the wearer may be exposed to sound that is of a substantially similar nature for an extended period.

Another embodiment of the present invention is a noise dosimeter system and method having the capability to receive an acoustic signal representative of the sound which would be presented to a user and also having the capability to rapidly measure sound level for a user-controllable amount of time and thereby predict noise dose over a user-settable dosimeter prediction interval in situations where the wearer may be exposed to sound that is of a substantially similar nature for an extended period.

Yet another embodiment of the present invention is a dosimeter system and method having the capability to rapidly measure sound level for a user-controllable amount of time and thereby predict noise dose over a user-settable dosimeter prediction interval in situations where the wearer may be exposed to sound that is of a substantially similar nature for an extended period, and having the capability to allow the user of the system to select an alternative prediction interval after the measurement is completed.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A dosimeter, comprising:
    an electronic circuit operable to receive at least one signal representative of a level of a hazard in an environment using at least one of:
        a hazard level sensor, and
        a direct input jack;
    a processor within the electronic circuit operable to:
        determine an accumulated dose over a user-controllable measurement interval, and
        predict hazardous exposure for a user-settable extended period greater than the user-controllable measurement interval and based on the accumulated dose; and
    a user-operable switch within the electronic circuit and in communication with said processor to control said user-controllable measurement interval to be less than a nominal measurement interval.

2. The dosimeter of claim 1 wherein the dosimeter is a noise dosimeter and the hazard level sensor is a microphone.

3. The dosimeter of claim 1 comprising an interface operable to communicate information regarding the accumulated dose to a second device, wherein the second device is operable to analyze the accumulated dose information.

4. The dosimeter of claim 1 wherein the hazard level sensor is automatically turned off when a direct input plug carrying a direct input signal is detected through the direct input jack.

5. The dosimeter of claim 1 comprising non-volatile memory for storage of a plurality of accumulated dose samples acquired over the user-controllable measurement interval.

6. The dosimeter of claim 5 wherein the non-volatile memory stores accumulated dose samples of a plurality of independent complete dose measurement runs.

7. The dosimeter of claim 1 comprising an external processor in communication with said electronic circuit operable to receive accumulated dose information and predicted hazardous exposure.

8. The dosimeter system of claim 7 wherein the external processor is operable to set the nominal measurement interval.

9. The dosimeter system of claim 7 wherein the external processor is operable to predict hazardous exposure for an alternative extended period selectable by an external processor user.

10. The dosimeter system of claim 1 wherein the electronic circuit operates in one of a plurality of user-selectable modes.

11. The dosimeter system of claim 1 comprising a display operable to display the predicted hazardous exposure.

12. A method for predicting exposure to a hazardous environment, the method comprising:
performing by at least one processing device, at least:
receiving at least one signal representative of a level of a hazard in an environment;
determining an accumulated dose over a user-controllable measurement interval, wherein the user-controllable measurement interval is less than a nominal measurement interval; and
predicting a hazardous exposure for a user-settable extended period greater than the user-controllable measurement interval and based on the accumulated dose.

13. The method of claim 12 comprising displaying the predicted hazardous exposure.

14. The method of claim 12 comprising determining a mode from one of a plurality of modes.

15. The method of claim 12 wherein determining the accumulated dose comprises:
determining a present hazard level,
calculating an incremental dose based on the present hazard level, and
adding the incremental dose to the accumulated dose until the user-controllable measurement interval is completed.

16. The method of claim 12 wherein the at least one signal representative of the level of the hazard in the environment is received from at least one of a sensor and a direct input jack.

17. The method of claim 16 wherein the at least one signal representative of the level of the hazard in the environment is an audio signal, the sensor is at least one microphone, and the direct input jack is a direct audio input.

18. The method of claim 12 comprising storing a plurality of accumulated dose samples acquired over the user-controllable measurement interval in non-volatile memory.

19. The method of claim 18 comprising reading and analyzing the plurality of accumulated dose samples from the non-volatile memory.

20. A computer-readable storage medium encoded with a set of instructions for execution on a computer, the set of instructions including:
a receiving routine for receiving at least one signal representative of a level of a hazard in an environment;
a determination routine for determining an accumulated dose over a user-controllable measurement interval, wherein the user-controllable measurement interval is less than a nominal measurement interval; and
a prediction routine for predicting a hazardous exposure for a user-settable extended period greater than the user-controllable measurement interval and based on the accumulated dose.

* * * * *